United States Patent
Zhou et al.

(10) Patent No.: US 11,861,122 B2
(45) Date of Patent: Jan. 2, 2024

(54) MESH STRUCTURE IN ELECTRONIC DEVICE, TOUCH CONTROL STRUCTURE, DISPLAY PANEL, METHOD OF ENHANCING LIGHT TRANSMITTANCE IN DISPLAY PANEL, AND METHOD OF FABRICATING MESH STRUCTURE

(71) Applicant: BOE Technology Group Co., Ltd., Beijing (CN)

(72) Inventors: Jian Zhou, Beijing (CN); Feng Wang, Beijing (CN); Yanzhao Li, Beijing (CN); Feng Qu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 57 days.

(21) Appl. No.: 17/614,981

(22) PCT Filed: Feb. 23, 2021

(86) PCT No.: PCT/CN2021/077408
§ 371 (c)(1),
(2) Date: Nov. 29, 2021

(87) PCT Pub. No.: WO2022/178659
PCT Pub. Date: Sep. 1, 2022

(65) Prior Publication Data
US 2023/0168779 A1   Jun. 1, 2023

(51) Int. Cl.
*G06F 3/044* (2006.01)
*G06F 1/16* (2006.01)

(52) U.S. Cl.
CPC .......... *G06F 3/0446* (2019.05); *G06F 1/1643* (2013.01); *G06F 2203/04103* (2013.01); *G06F 2203/04112* (2013.01)

(58) Field of Classification Search
CPC ................ G06F 3/0446; G06F 1/1643; G06F 2203/04103; G06F 2203/04112
See application file for complete search history.

(56) References Cited

U.S. PATENT DOCUMENTS

2014/0085551 A1    3/2014   Koo et al.
2018/0024673 A1    1/2018   Han et al.
(Continued)

FOREIGN PATENT DOCUMENTS

CN       203117942 U    8/2013
CN       103547984 A    1/2014
(Continued)

OTHER PUBLICATIONS

International Search Report & Written Opinion dated Nov. 23, 2021, regarding PCT/CN2021/077408.
(Continued)

*Primary Examiner* — Deeprose Subedi
(74) *Attorney, Agent, or Firm* — Intellectual Valley Law, P.C.

(57) ABSTRACT

A mesh structure is provided. The mesh structure includes a first insulating layer; one or more mesh lines on a first side of the first insulating layer; and one or more protruding structures on a second side of the first insulating layer, the second side being opposite to the first side. An orthographic projection of a respective protruding structure on a projection plane containing a surface of the first insulating layer at least partially overlaps with an orthographic projection of a respective mesh line on the projection plane. A refractive index of the one or more protruding structures is greater than a refractive index of the first insulating layer.

20 Claims, 20 Drawing Sheets

(56) References Cited

U.S. PATENT DOCUMENTS

| | | |
|---|---|---|
| 2018/0350883 A1 | 12/2018 | Lee et al. |
| 2019/0086713 A1 | 3/2019 | Yang et al. |
| 2019/0087039 A1 | 3/2019 | Chang et al. |
| 2019/0319076 A1 | 10/2019 | Lee et al. |
| 2020/0212346 A1 | 7/2020 | Lee |
| 2022/0206615 A1* | 6/2022 | Kong .................. G06F 3/04164 |

FOREIGN PATENT DOCUMENTS

| | | |
|---|---|---|
| CN | 203658973 U | 6/2014 |
| CN | 105892172 A | 8/2016 |
| CN | 107577093 A | 1/2018 |
| CN | 107634085 A | 1/2018 |
| CN | 108987605 A | 12/2018 |
| CN | 109545429 A | 3/2019 |
| CN | 208985133 U | 6/2019 |
| CN | 111384289 A | 7/2020 |
| EP | 3736673 A1 | 11/2020 |

OTHER PUBLICATIONS

S. Jang et al.; "A Three-dimensional metal grid as a practical alternative to ITO", Nanoscale, vol. 8, Issue 29. 2016, pp. 14257-14263.

* cited by examiner

MESH STRUCTURE IN ELECTRONIC DEVICE, TOUCH CONTROL STRUCTURE, DISPLAY PANEL, METHOD OF ENHANCING LIGHT TRANSMITTANCE IN DISPLAY PANEL, AND METHOD OF FABRICATING MESH STRUCTURE

CROSS-REFERENCE TO RELATED APPLICATION

This application is a national stage application under 35 U.S.C. § 371 of International Application No. PCT/CN2021/077408, filed Feb. 23, 2021, the contents of which are incorporated by reference in the entirety.

TECHNICAL FIELD

The present invention relates to the field of display technology, more particularly, to a mesh structure in an electronic device, a touch control structure, a display panel, a method of enhancing light transmittance in a display panel, and a method of fabricating a mesh structure in an electronic device.

BACKGROUND

Mesh structures may be made of various materials, including metal, alloy, carbon nanotubes, and graphene. Mesh structures are highly conductive and can be made ultra-thin. Thus, mesh structures have been widely used in electronic devices such as wearable devices, foldable devices, and ultra-thin devices.

SUMMARY

In one aspect, the present disclosure provides a mesh structure, comprising a first insulating layer; one or more mesh lines on a first side of the first insulating layer; and one or more protruding structures on a second side of the first insulating layer, the second side being opposite to the first side; wherein an orthographic projection of a respective protruding structure on a projection plane containing a surface of the first insulating layer at least partially overlaps with an orthographic projection of a respective mesh line on the projection plane; and a refractive index of the one or more protruding structures is greater than a refractive index of the first insulating layer.

Optionally, a cross-section width of a cross-section of the respective protruding structure along a plane intersecting the respective protruding structure and the respective mesh line and perpendicular to a longitudinal direction of the respective mesh line decreases along a protruding direction from the first side to the second side.

Optionally, a first central line of an orthographic projection of the respective protruding structure on the projection plane and a second central line of an orthographic projection of the respective mesh line on the projection plane are spaced apart from each other by a distance in a range of 0 to 75% of a line width of the respective mesh line.

Optionally, a first central line of an orthographic projection of the respective protruding structure on the projection plane and a second central line of an orthographic projection of the respective mesh line on the projection plane are spaced apart from each other by a distance in a range of 0 to 75% of a maximum value of the cross-section width.

Optionally, the first central line and the second central line are substantially parallel to the longitudinal direction.

Optionally, a maximum value of the cross-section width is in a range of 12.5% to 150% of a thickness of the respective protruding structure along the protruding direction.

Optionally, the maximum value of the cross-section width is in a range of 75% to 125% of the thickness of the respective protruding structure along the protruding direction.

Optionally, a thickness of the respective protruding structure along the protruding direction is in a range of 25% to 175% of a maximum value of the cross-section width.

Optionally, the mesh structure further comprises a second insulating layer indirect contact with the one or more protruding structures; wherein a difference between a refractive index of the second insulating layer and the refractive index of the of the one or more protruding structures is equal to or less than 0.2.

Optionally, the respective protruding structure has a continuously curved protruding surface.

Optionally, the respective protruding structure has a truncated ellipsoidal shape.

Optionally, the one or more protruding structures comprise an optically clear material.

Optionally, the mesh structure further comprises a second insulating layer in direct contact with the one or more protruding structures; and an optical clear adhesive layer adhering the first insulating layer and the second insulating layer together.

Optionally, the mesh structure further comprises a second insulating layer in direct contact with the one or more protruding structures: wherein the second insulating layer is between the one or more protruding structures and the first insulating layer.

Optionally, the mesh structure further comprises a second insulating layer in direct contact with the one or more protruding structures; wherein the one or more protruding structures are between the second insulating layer and the first insulating layer.

Optionally, a cross-section width of a cross-section of the respective protruding structure along a plane intersecting the respective protruding structure and the respective mesh line and perpendicular to a longitudinal direction of the respective mesh line decreases along a protruding direction from the second side to the first side.

Optionally, the one or more protruding structures comprise a plurality of protrusions; and an orthographic projection of a respective one of the plurality of protrusions on the projection plane at least partially overlaps with the orthographic projection of a portion of the one or more mesh lines on the projection plane.

Optionally, the one or more protruding structures comprise a continuous protruding ridge; and an orthographic projection of the continuous protruding ridge on the projection plane at least partially overlaps with the orthographic projection of the respective mesh line on the projection plane.

In another aspect, the present disclosure provides an electronic device, comprising the mesh structure described herein or fabricated by a method described herein, and a semiconductor component.

In another aspect, the present disclosure provides a method of fabricating a mesh structure, comprising forming one or more mesh lines on a first side of a first insulating layer; and forming one or more protruding structures on a second side of the first insulating layer, the second side being opposite to the first side; wherein an orthographic projection of a respective protruding structure on a projection plane containing a surface of the first insulating layer at least partially overlaps with an orthographic projection of a respective mesh line on the projection plane; a refractive index of the one or more protruding structures is greater than a refractive index of the first insulating layer; and a cross-section width of a cross-section of the respective protruding structure along a plane intersecting the respective protruding structure and the respective mesh line and perpendicular to a longitudinal direction of the respective mesh line decreases along a protruding direction from the first side to the second side.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a mesh structure, an electronic device, and a method of fabricating a mesh structure that substantially obviate one or more of the problems due to limitations and disadvantages of the related art. In one aspect, the mesh structure in an electronic device includes a first insulating layer; one or more mesh lines on a first side of the first insulating layer; and one or more protruding structures on a second side of the first insulating layer, the second side being opposite to the first side. Optionally, an orthographic projection of a respective protruding structure on a projection plane containing a surface of the first insulating layer at least partially overlaps with an orthographic projection of a respective mesh line on the projection plane. Optionally, a refractive index of the one or more protruding structures is greater than a refractive index of the first insulating layer.

The inventors of the present disclosure discover that, surprisingly and unexpectedly, light transmittance through the one or more mesh lines (for example, in an electronic device) can be significantly increased by having a mesh structure with an intricate structure provided by the present disclosure. In one example, the light transmittance through the one or more mesh lines can be enhanced by more than 10% (e.g., more than 12%, more than 14%, more than 16%). Moreover, the significant increase in the light transmittance through the one or more mesh lines is observed throughout the visible light spectrum.

Figure 1A:
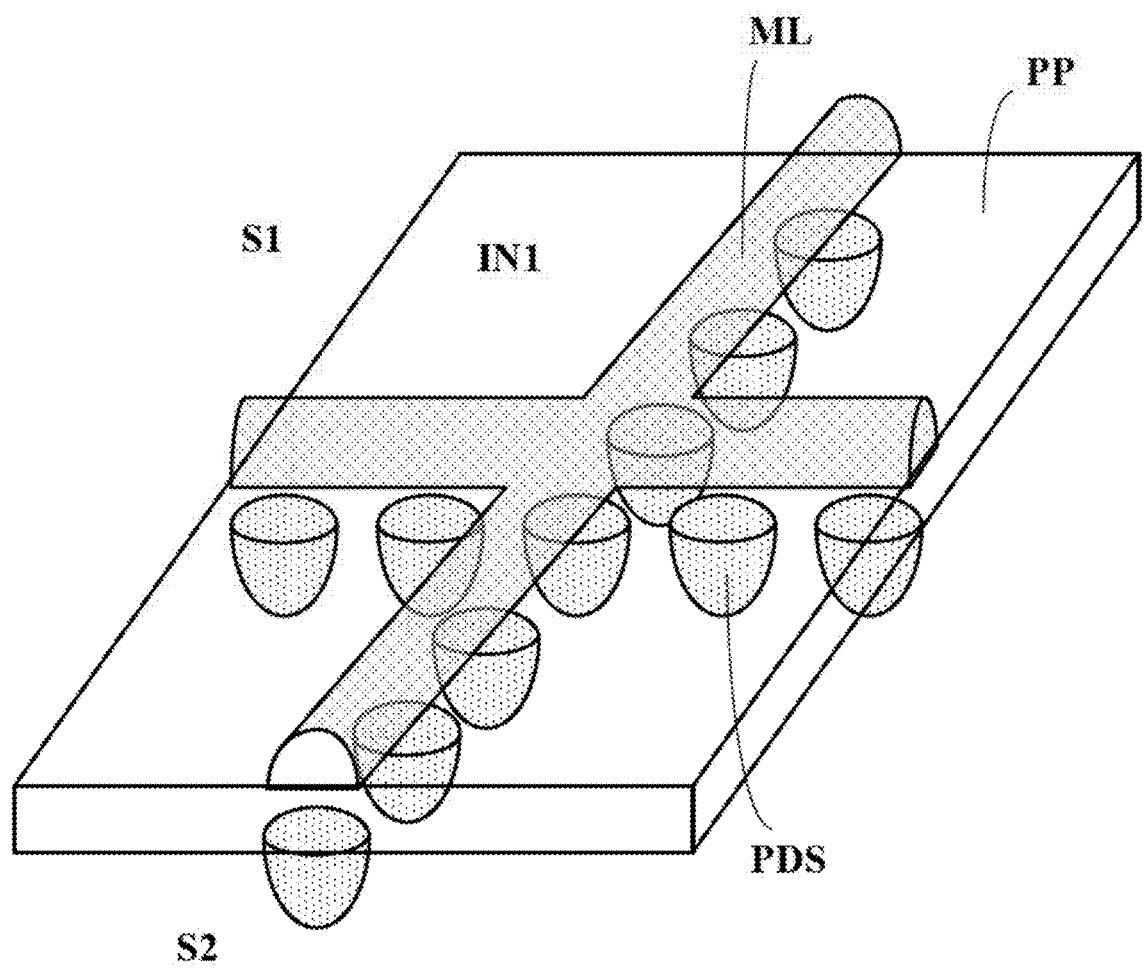
FIG. 1A is a perspective view of a portion of a mesh structure in some embodiments according to the present disclosure.

FIG. 1A is a perspective view of a portion of a mesh structure in some embodiments according to the present disclosure. Referring to FIG. 1A, the mesh structure in some embodiments includes a first insulating layer IN1; one or more mesh lines ML on a first side S1 of the first insulating layer IN1; and one or more protruding structures PDS on a second side of the first insulating layer IN1, the second side S2 being opposite to the first side S1.

Figure 1B:
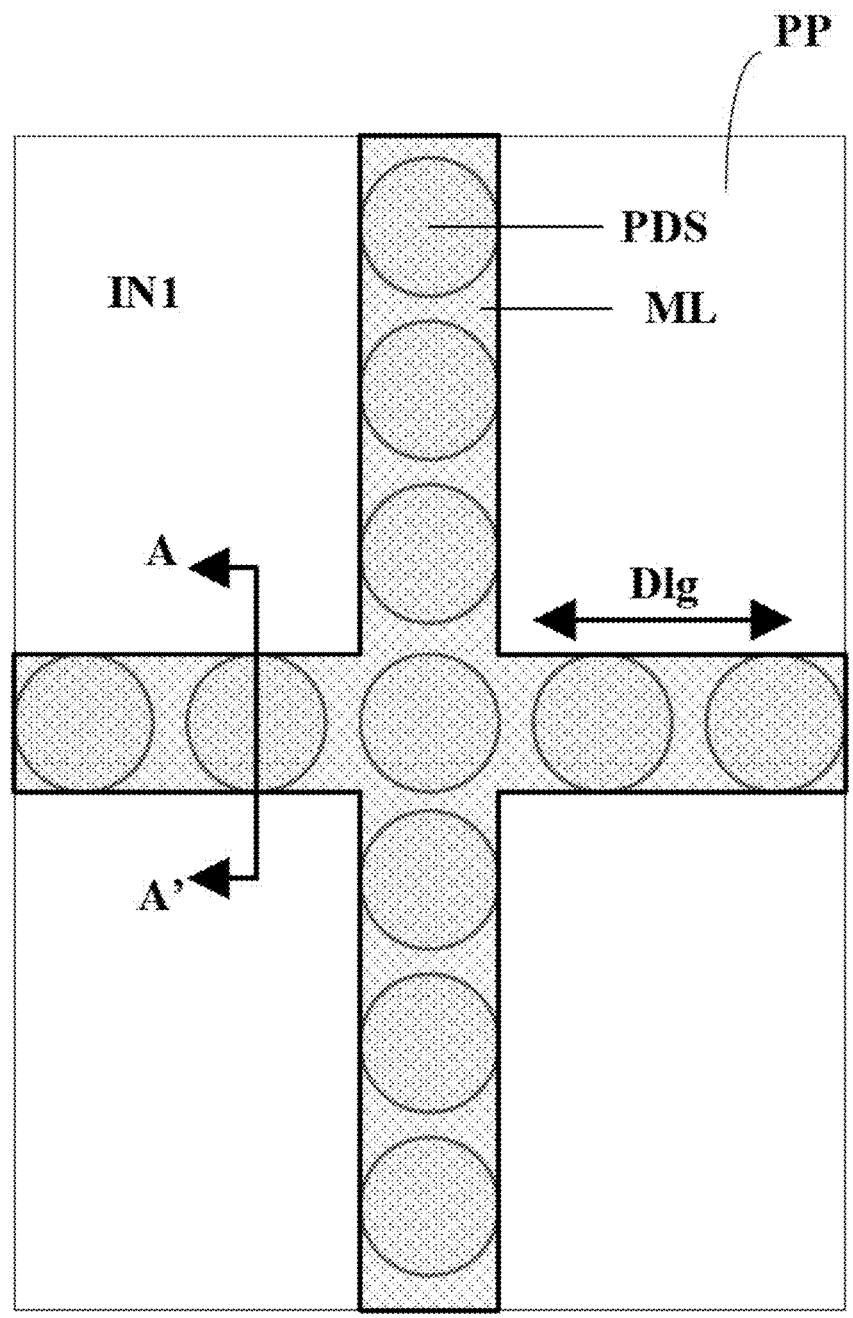
FIG. 1B is a plan view of a portion of a mesh structure in some embodiments according to the present disclosure.

FIG. 1B is a plan view of a portion of a mesh structure in some embodiments according to the present disclosure. Referring to FIG. 1A and FIG. 1B, in some embodiments, an orthographic projection of the one or more protruding structures PDS on a projection plane PP containing a surface of the first insulating layer IN1 at least partially overlaps with an orthographic projection of the one or more mesh lines ML on the projection plane PP. Optionally, the orthographic projection of the one or more mesh lines ML on the projection plane PP substantially (e.g., at least 75%, at least 80%, at least 85%, at least 90%, at least 95%, at least 99%, or 100%) covers the orthographic projection of the one or more protruding structures PDS on the projection plane PP. Optionally, the orthographic projection of the one or more mesh lines ML on the projection plane PP completely covers the orthographic projection of the one or more protruding structures PDS on the projection plane PP.

Figure 1C:
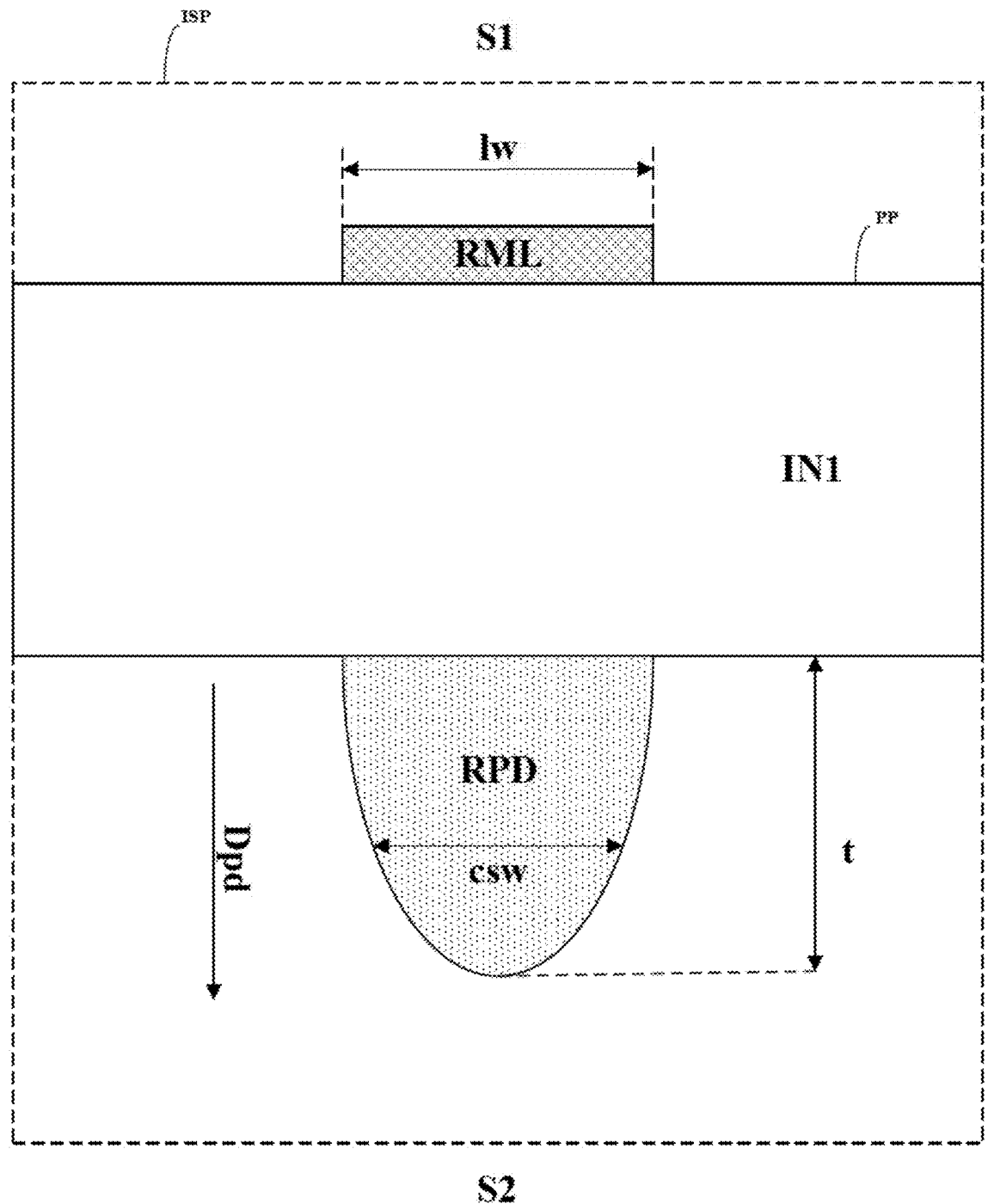
FIG. 1C is a cross-sectional view along an A-A' line in FIG. 1B.

FIG. 1C is a cross-sectional view along an A-A' line in FIG. 1B. Referring to FIG. 1C, in some embodiments, an orthographic projection of a respective protruding structure RPD on a projection plane PP containing a surface of the first insulating layer IN1 at least partially overlaps with an orthographic projection of a respective mesh line RML on the projection plane PP. Optionally, the orthographic projection of the respective mesh line RML on the projection plane PP substantially (e.g., at least 75%, at least 80%, at least 85%, at least 90%, at least 95%, at least 99%, or 100%) covers the orthographic projection of the respective protruding structure RPD on the projection plane PP. Optionally, the orthographic projection of the respective mesh line RML on the projection plane PP completely covers the orthographic projection of the respective protruding structure RPD on the projection plane PP.

In some embodiments, a refractive index of the one or more protruding structures is greater than a refractive index of the first insulating layer. Optionally, the refractive index of the one or more protruding structures is greater than the refractive index of the first insulating layer by at least 0.01, e.g., at least 0.02, at least 0.03, at least 0.04, at least 0.05, at least 0.06, at least 0.07, at least 0.08, at least 0.09, at least 0.10, at least 0.11, at least 0.12, at least 0.13, at least 0.14, at least 0.15, at least 0.16, at least 0.17, at least 0.18, or at least 0.20.

In some embodiments, referring to FIG. 1B and FIG. 1C, a cross-section width csw of a cross-section of the respective protruding structure RPD along a plane ISP intersecting the respective protruding structure RPD and the respective mesh line RML and perpendicular to a longitudinal direction Dlg of the respective mesh line RML decreases along a protruding direction Dpd from the first side S1 to the second side S2.

Figure 1D:
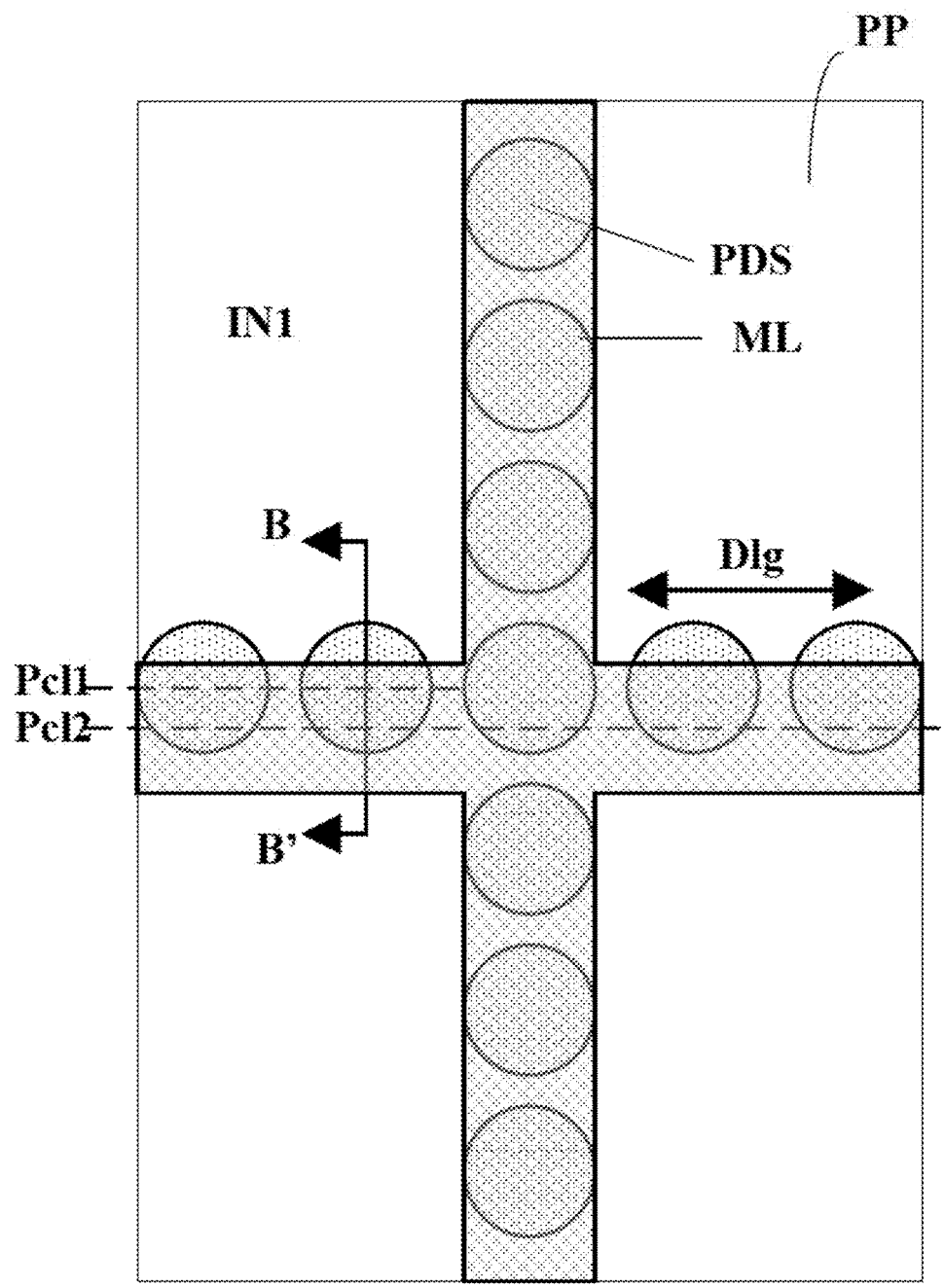
FIG. 1D is a plan view of a portion of a mesh structure in some embodiments according to the present disclosure.
Figure 1E:
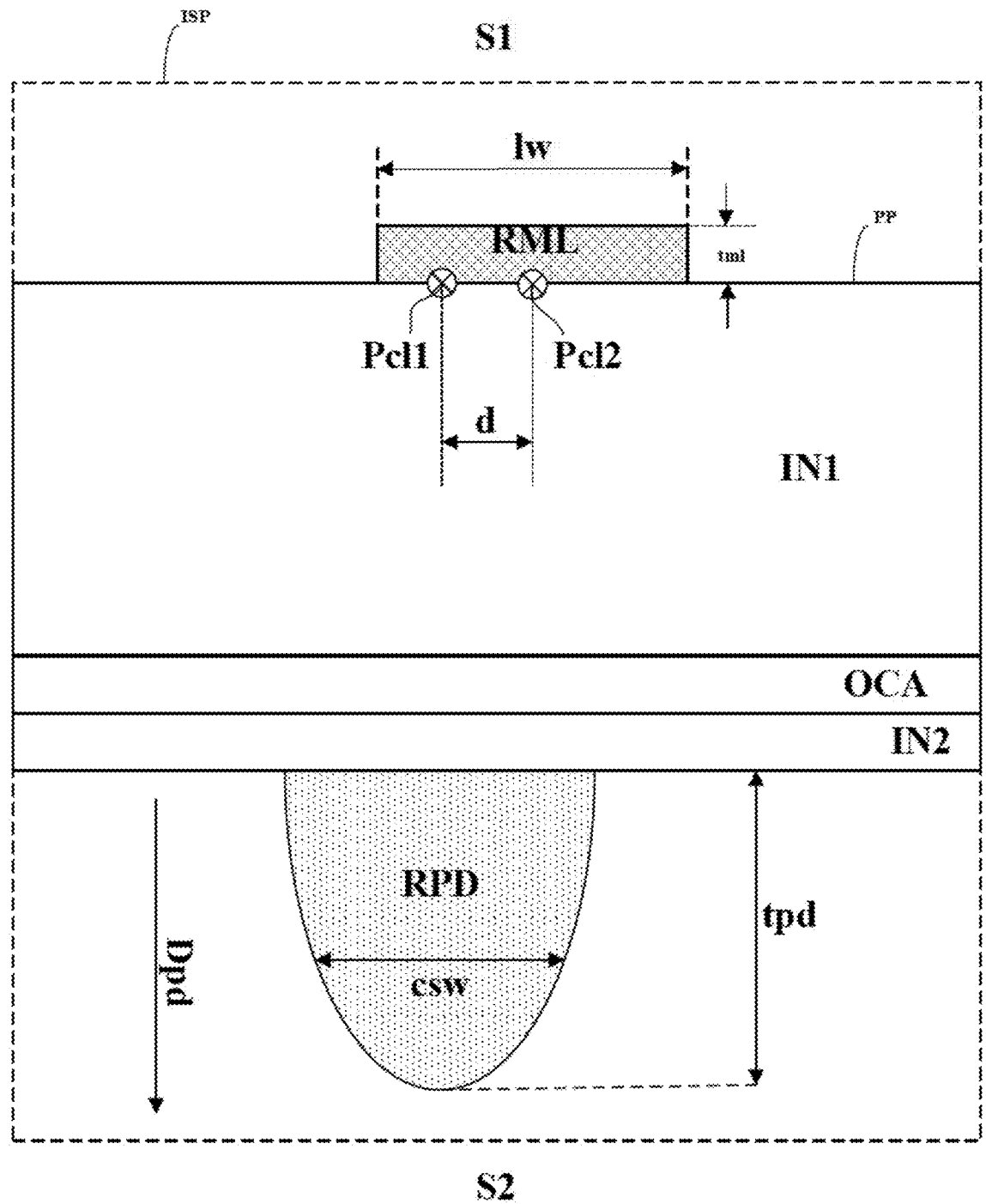
FIG. 1E is a cross-sectional view along a B-B' line in FIG. 1D.

FIG. 1D is a plan view of a portion of a mesh structure in some embodiments according to the present disclosure. FIG. 1E is a cross-sectional view along a B-B' line in FIG. 1D. Referring to FIG. 1D and FIG. 1E, in some embodiments, the orthographic projection of the respective mesh line RML on the projection plane PP partially overlaps with the orthographic projection of the respective protruding structure RPD on the projection plane PP. A first central line Pcl1 of an orthographic projection of the respective protruding structure RPD on the projection plane PP and a second central line Pcl2 of an orthographic projection of the respective mesh line RML on the projection plane PP are spaced apart from each other by a distance d. In FIG. 1B and FIG. 1C, the first central line and the second central line overlap with each other, and the distance d equals to zero. In FIG. 1D and FIG. 1E, the distance d is greater than zero, e.g., the first central line Pcl1 and the second central line Pcl2 are offset from each other.

Optionally, the first central line Pcl1 and the second central line Pcl2 are substantially parallel to the longitudinal direction Dlg. As used herein, the term "substantially parallel" means that an angle is in the range of 0 degree to approximately 45 degrees, e.g., 0 degree to approximately 5 degrees, 0 degree to approximately 10 degrees, 0 degree to approximately 15 degrees, 0 degree to approximately 20 degrees, 0 degree to approximately 25 degrees, 0 degree to approximately 30 degrees. Optionally, the first central line Pcl1 and the second central line Pcl2 are parallel to the longitudinal direction Dlg.

Referring to FIG. 1D and FIG. 1E, in some embodiments, the mesh structure further includes a second insulating layer IN2 in direct contact with the one or more protruding structures (e.g., the respective protruding structure RPD). Optionally, the mesh structure further includes an optical clear adhesive layer OCA adhering the first insulating layer IN1 and the second insulating layer IN2 together.

Figure 2:
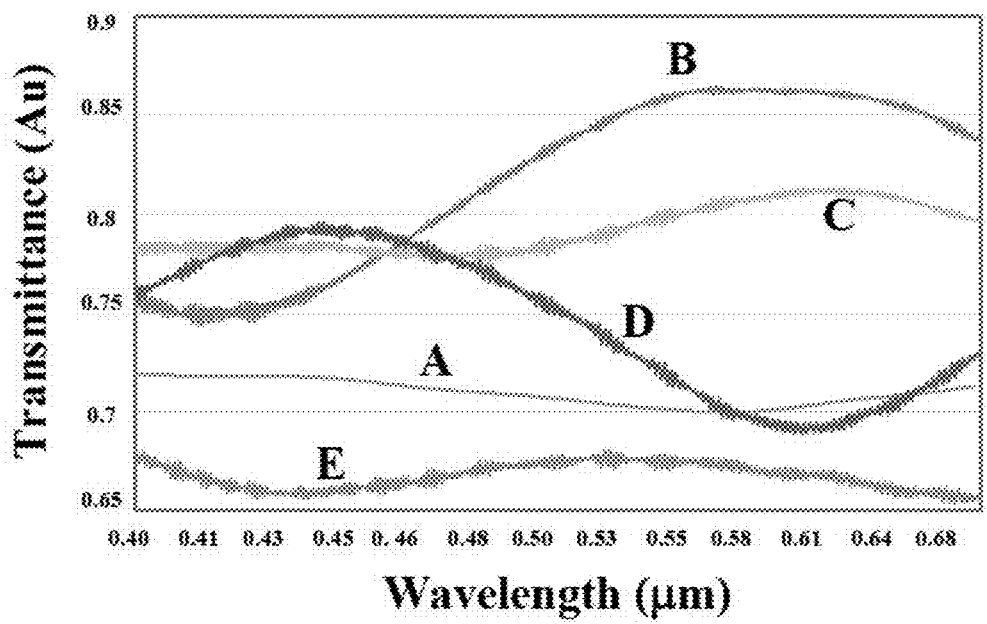
FIG. 2 illustrates a correlation between light transmittance and a distance between a first central line and a second central line.

In one example, the respective mesh line RML has a line width 1w of 4 μm and a thickness tml of 700 nm. The first insulating layer IN1 has a refractive index of 1.53. The optical clear adhesive layer OCA has a refractive index of 1.6. The second insulating layer IN2 has a refractive index of 1.53. The cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm. The respective protruding structure RPD has a refractive index of 1.65. FIG. 2 illustrates a correlation between light transmittance and a distance between a first central line and a second central line. Referring to FIG. 2, the curve A represents light transmittance of the mesh structure for light having a wavelength in a range of 0.40 μm to 0.68 μm when the one or more protruding structures are absent; the curve B represents light transmittance of the mesh structure for light having a wavelength in a range of 0.40 un to 0.68 μm when the one or more protruding structures are present and the distance d is zero; the curve C represents light transmittance of the mesh structure for light having a wavelength in a range of 0.40 μm to 0.68 μm when the one or more protruding structures are present and the distance d is 1 μm; the curve D represents light transmittance of the mesh structure for light having a wavelength in a range of 0.40 μm to 0.68 μm when the one or more protruding structures are present and the distance d is 2 μm; and the curve E represents light transmittance of the mesh structure for light having a wavelength in a range of 0.40 μm to 0.68 μm when the one or more protruding structures are present and the distance d is 3 μm. As compared to the light transmittance in the curve A, the light transmittance in the curve B is significantly enhanced, e.g., by 16% at a wavelength around 0.56 μm.

The light transmittance in the curve E is lower than the light transmittance in the curve A wherein the one or more protruding structures are absent in the mesh structure, indicating that the distance by which the first central line Pcl1 and the second central line Pcl2 are offset from each other should be maintained in a certain range in order to effectively enhance light transmittance.

In some embodiments, a first central line Pcl1 of an orthographic projection of the respective protruding structure RPD on the projection plane PP and a second central line Pcl2 of an orthographic projection of the respective mesh line RML on the projection plane PP are spaced apart from each other by a distance in a range of 0 to 75% (e.g., 0 to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, or 65% to 70%) of a line width lw of the respective mesh line RML. Optionally, the first central line Pcl1 of an orthographic projection of the respective protruding structure RPD on the projection plane PP and the second central line Pcl2 of an orthographic projection of the respective mesh line RML on the projection plane PP are spaced apart by a distance in a range of 0 to 5% of a line width lw of the respective mesh line RML.

In some embodiments, a first central line Pcl1 of an orthographic projection of the respective protruding structure RPD on the projection plane PP and a second central line Pcl2 of an orthographic projection of the respective mesh line RML on the projection plane PP are spaced apart from each other by a distance in a range of 0 to 75% (e.g., 0 to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, or 65% to 70%) of a maximum value of the cross-section width csw. Optionally, the first central line Pcl1 of an orthographic projection of the respective protruding structure RPD on the projection plane PP and the second central line Pcl2 of an orthographic projection of the respective mesh line RML on the projection plane PP are spaced apart by a distance in a range of 0 to 5% of a maximum value of the cross-section width csw.

In some embodiments, the first central line Pcl1 of an orthographic projection of the respective protruding structure RPD on the projection plane PP and the second central line Pcl2 of an orthographic projection of the respective mesh line RML on the projection plane PP are spaced apart from each other by a distance no more than 3.0 µm, e.g., no more than 2.5 µm, no more than 2.0 µm, no more than 1.5 µm, no more than 1.0 µm, no more than 0.5 µm, no more than 0.4 µm, no more than 0.3 µm, no more than 0.2 un, or no more than 0.1 µm.

Figure 3:
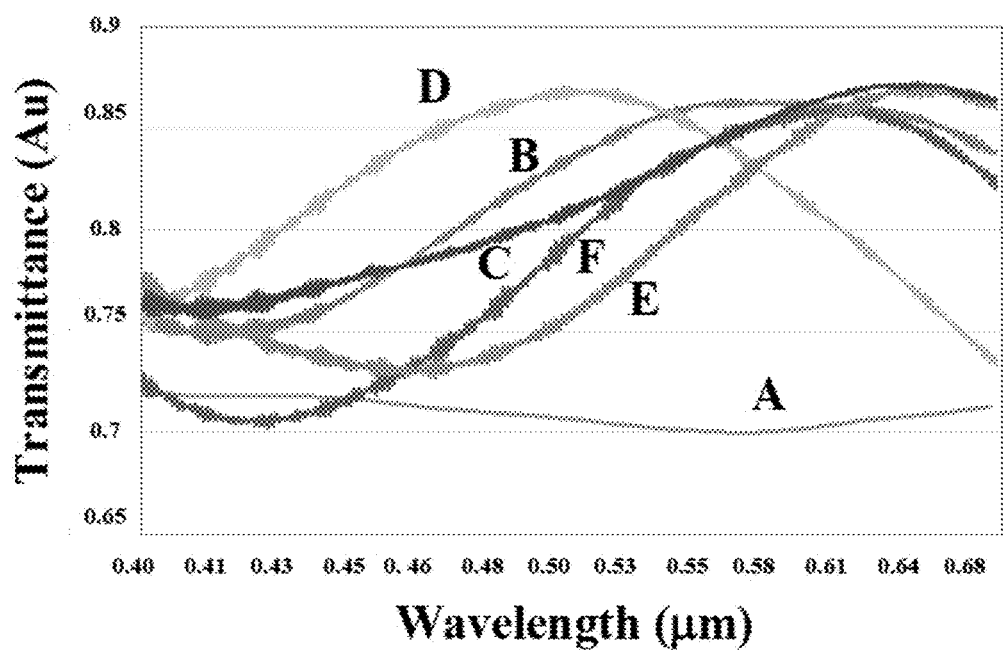
FIG. 3 illustrates a correlation between light transmittance and a maximum value of the cross-section width.

In one example, the respective mesh line RML has a line width lw of 4 µm and a thickness tml of 700 nm. The first insulating layer IN1 has a refractive index of 1.53. The optical clear adhesive layer OCA has a refractive index of 1.6. The second insulating layer IN2 has a refractive index of 1.53. The cross-section of the respective protruding structure RPD along the plane ISP has a half elliptical shape, with a long axis radius (equivalent to a thickness tpd of the respective protruding structure RPD along the protruding direction Dpd) of 4 µm. The respective protruding structure RPD has a refractive index of 1.65. FIG. 3 illustrates a correlation between light transmittance and a maximum value of the cross-section width. Referring to FIG. 3, the curve A represents light transmittance of the mesh structure for light having a wavelength in a range of 0.40 µm to 0.68 µm when the one or more protruding structures are absent; the curve B represents light transmittance of the mesh structure for light having a wavelength in a range of 0.40 µm to 0.68 µm when the one or more protruding structures are present and the cross-section of the respective protruding structure RPD along the plane ISP has a short axis diameter (equivalent to a maximum value of the cross-section width csw) of 4 µm; the curve C represents light transmittance of the mesh structure for light having a wavelength in a range of 0.40 µm to 0.68 µm when the one or more protruding structures are present and the cross-section of the respective protruding structure RPD along the plane ISP has a short axis diameter of 3 µm; the curve D represents light transmittance of the mesh structure for light having a wavelength in a range of 0.40 µm to 0.68 µm when the one or more protruding structures are present and the cross-section of the respective protruding structure RPD along the plane ISP has a short axis diameter of 2 µm; the curve E represents light transmittance of the mesh structure for light having a wavelength in a range of 0.40 µm to 0.68 µm when the one or more protruding structures are present and the cross-section of the respective protruding structure RPD along the plane ISP has a short axis diameter of 1 µm; and the curve F represents light transmittance of the mesh structure for light having a wavelength in a range of 0.40 µm to 0.68 µm when the one or more protruding structures are present and the cross-section of the respective protruding structure RPD along the plane ISP has a short axis diameter of 0.5 µm.

As shown in FIG. 3, as compared to a mesh structure in which the one or more protruding structures are absent (the curve A), the light transmittance of the mesh structure having the one or more protruding structures can be enhanced at various values of short axis diameter (e.g., from 0.5 µm to 4 µm; the curve B to the curve F).

In some embodiments, a maximum value of the cross-section width csw is in a range of 12.5% to 150% (e.g., 12.5% to 25.0%, 25.0% to 50.0%, 50.0% to 75.0%, 75.0% to 100.0%, 100.0% to 125.0%, or 125.0% to 150.0%) of a thickness tpd of the respective protruding structure RPD along the protruding direction Dpd. Optionally, the maximum value of the cross-section width csw is in a range of 75% to 125% (e.g., 75.0% to 100.0%, 100.0% to 125.0%) of the thickness tpd of the respective protruding structure RPD along the protruding direction Dpd.

In some embodiments, a maximum value of the cross-section width csw is in a range of 12.5% to 150% (e.g., 12.5% to 25.0%, 25.0% to 50.0%, 50.0% to 75.0%, 75.0% to 100.0%, 100.0% to 125.0%, or 125.0% to 150.0%) of a line width lw of the respective mesh line RML. Optionally, the maximum value of the cross-section width csw is in a range of 75% to 125% (e.g., 75.0% to 100.0%, 100.0% to 125.0%) of the line width lw of the respective mesh line RML.

Figure 4:
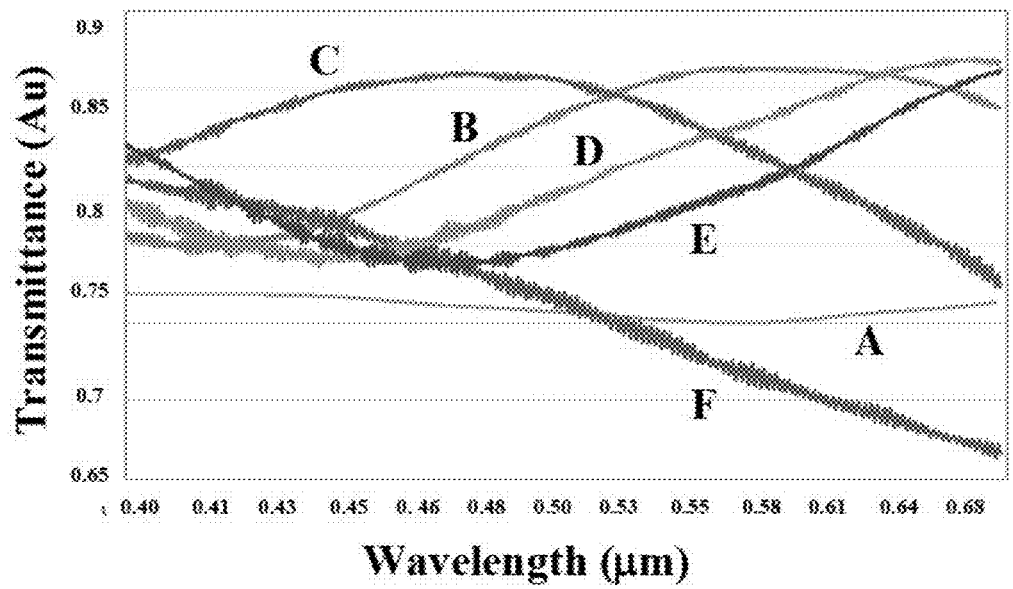
FIG. 4 illustrates a correlation between light transmittance and a thickness of the respective protruding structure along the protruding direction.

In one example, the respective mesh line RML has a line width lw of 4 µm and a thickness tml of 700 nm. The first insulating layer IN1 has a refractive index of 1.53. The optical clear adhesive layer OCA has a refractive index of 1.6. The second insulating layer IN2 has a refractive index of 1.53. The cross-section of the respective protruding structure RPD along the plane ISP has a half elliptical shape, with a short axis radius (equivalent to a maximum value of the cross-section width csw) of 4 µm. The respective protruding structure RPD has a refractive index of 1.65. FIG. 4 illustrates a correlation between light transmittance and a thickness of the respective protruding structure along the protruding direction. Referring to FIG. 4, the curve A represents light transmittance of the mesh structure for light having a wavelength in a range of 0.40 µm to 0.68 µm when the one or more protruding structures are absent; the curve B represents light transmittance of the mesh structure for light having a wavelength in a range of 0.40 µm to 0.68 µm when the one or more protruding structures are present and the cross-section of the respective protruding structure RPD along the plane ISP has a long axis radius (equivalent to a thickness tpd of the respective protruding structure RPD along the protruding direction Dpd) of 4 µm; the curve C represents light transmittance of the mesh structure for light having a wavelength in a range of 0.40 µm to 0.68 µm when the one or more protruding structures are present and the cross-section of the respective protruding structure RPD along the plane ISP has a long axis radius of 3 μm; the curve D represents light transmittance of the mesh structure for light having a wavelength in a range of 0.40 μm to 0.68 μm when the one or more protruding structures are present and the cross-section of the respective protruding structure RPD along the plane ISP has a long axis radius of 2 μm; the curve E represents light transmittance of the mesh structure for light having a wavelength in a range of 0.40 μm to 0.68 μm when the one or more protruding structures are present and the cross-section of the respective protruding structure RPD along the plane ISP has a long axis radius of 1 μm; and the curve F represents light transmittance of the mesh structure for light having a wavelength in a range of 0.40 μm to 0.68 μm when the one or more protruding structures are present and the cross-section of the respective protruding structure RPD along the plane ISP has a long axis radius of 0.5 μm.

The light transmittance in the curve E is lower than the light transmittance in the curve A wherein the one or more protruding structures are absent in the mesh structure, indicating that the long axis radius of the half elliptical shape (equivalent to a thickness tpd of the respective protruding structure RPD along the protruding direction Dpd) should be maintained in a certain range in order to effectively enhance light transmittance.

In some embodiments, a thickness of the respective protruding structure RPD along the protruding direction Dpd is in a range of 25% to 175% (e.g., 25.0% to 50.0%, 50.0% to 75.0%, 75.0% to 100.0%, 100.0% to 125.0%, 125.0% to 150.0%, or 150.0% to 175.0%) of a maximum value of the cross-section width csw. Optionally, the thickness of the respective protruding structure RPD along the protruding direction Dpd is in a range of 75% to 125% (e.g., 75.0% to 100.0%, 100.0% to 125.0%) of the maximum value of the cross-section width csw.

In some embodiments, a thickness of the respective protruding structure RPD along the protruding direction Dpd is in a range of 25% to 175% (e.g., 25.0% to 50.0%, 50.0% to 75.0%, 75.0% to 100.0%, 100.0% to 125.0%, 125.0% to 150.0%, or 150.0% to 175.0%) of a line width lw of the respective mesh line RML. Optionally, the thickness of the respective protruding structure RPD along the protruding direction Dpd is in a range of 75% to 125% (e.g., 75.0% to 100.0%, 100.0% to 125.0%) of the line width lw of the respective mesh line RML.

Referring to FIG. 1D and FIG. 1E, in some embodiments, the mesh structure further includes a second insulating layer IN2 in direct contact with the one or more protruding structures (e.g., the respective protruding structure RPD). Optionally, the mesh structure further includes an optical clear adhesive layer OCA adhering the first insulating layer IN1 and the second insulating layer IN2 together.

Figure 5:
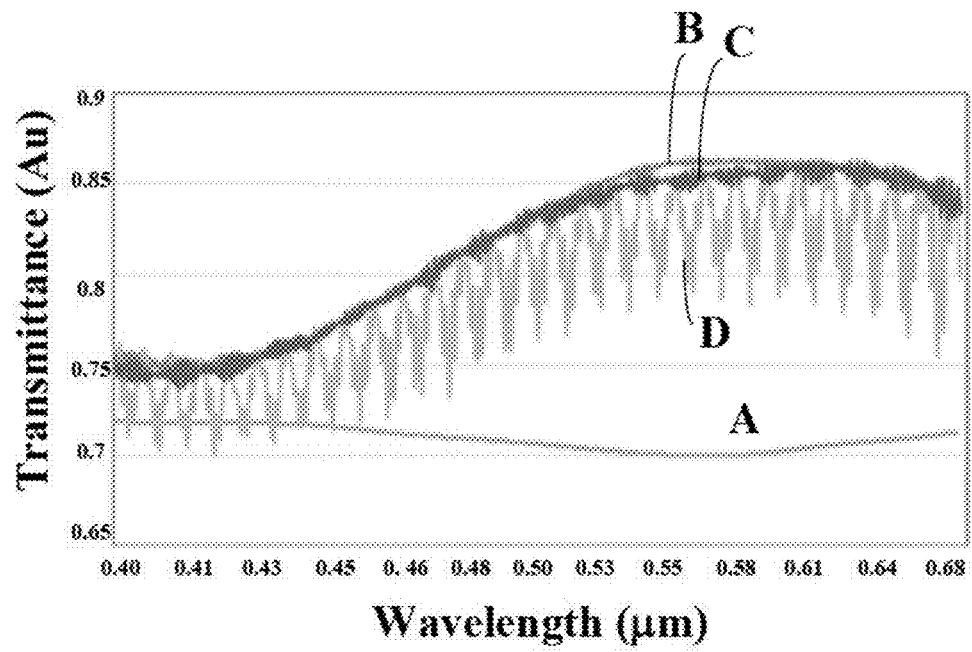
FIG. 5 illustrates a correlation between light transmittance and a refractive index of a second insulating layer.

In one example, the respective mesh line RML has a line width lw of 4 μm and a thickness tml of 700 nm. The first insulating layer IN1 has a refractive index of 1.53. The optical clear adhesive layer OCA has a refractive index of 1.6. The cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm. The respective protruding structure RPD has a refractive index of 1.65. The first central line Pcl1 of an orthographic projection of the respective protruding structure RPD on the projection plane PP and the second central line Pcl2 of an orthographic projection of the respective mesh line RML on the projection plane PP are spaced apart by a distance of zero. FIG. 5 illustrates a con-elation between light transmittance and a refractive index of a second insulating layer. Referring to FIG. 5, the curve A represents light transmittance of the mesh structure for light having a wavelength in a range of 0.40 μm to 0.68 μm when the one or more protruding structures are absent; the curve B represents light transmittance of the mesh structure for light having a wavelength in a range of 0.40 μm to 0.68 μm when the one or more protruding structures are present and the second insulating layer IN2 is made of a cyclic olefin copolymer material having a refractive index of 1.53; the curve C represents light transmittance of the mesh structure for light having a wavelength in a range of 0.40 μm to 0.68 μm when the one or more protruding structures are present and the second insulating layer IN2 is made of silicon oxide having a refractive index of 1.45; and the curve C represents light transmittance of the mesh structure for light having a wavelength in a range of 0.40 μm to 0.68 μm when the one or more protruding structures are present and the second insulating layer IN2 is made of silicon nitride having a refractive index of 2.0.

As shown in FIG. 5, when the refractive index of the second insulating layer IN2 is similar to the refractive index of the respective protruding structure RPD (e.g., the curve B and the curve C), the light transmittance of the mesh structure can be significantly enhanced as compared to the mesh structure in which the one or more protruding structures are absent. When the difference between the refractive index of the second insulating layer IN2 and the refractive index of the refractive index of the respective protruding structure RPD exceeds a certain value (e.g., the curve D), the light transmittance of the mesh structure follows the same trend of variation across the range of wavelengths, however, with a far more intense resonance of the oscillation peak. This phenomenon is caused by a stronger Fabry-Perot cavity truncation effect due to the large difference between the refractive index of the second insulating layer IN2 and the refractive index of the refractive index of the respective protruding structure RPD.

Figure 6:
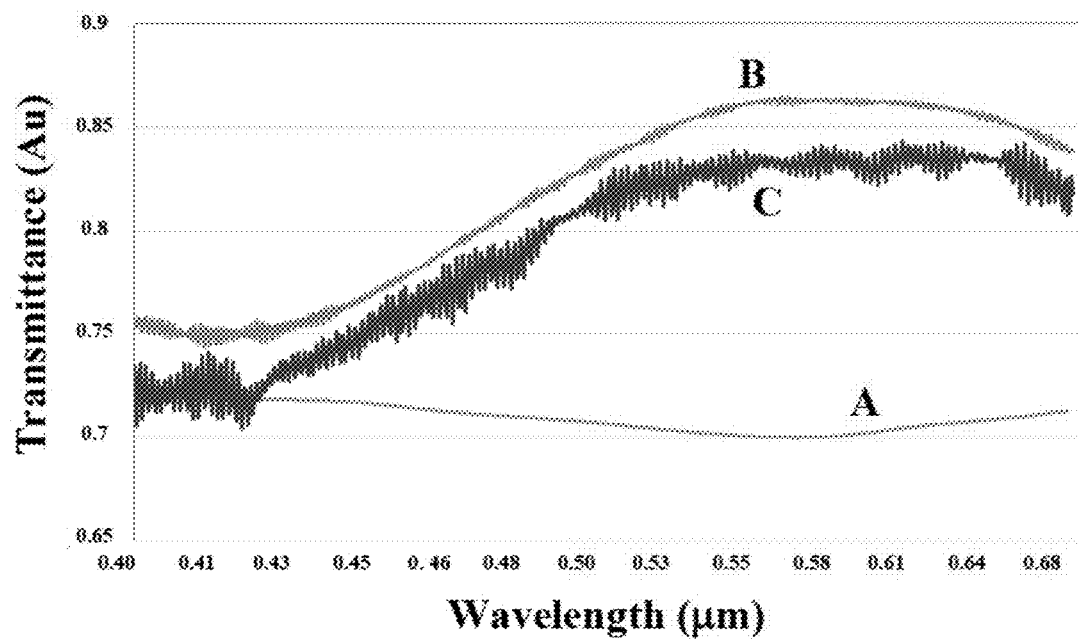
FIG. 6 illustrates a correlation between light transmittance and a refractive index of a respective protruding structure.

In one example, the respective mesh line RML has a line width lw of 4 μm and a thickness tml of 700 nm. The first insulating layer IN1 has a refractive index of 1.53. The second insulating layer IN2 has a refractive index of 1.53. The optical clear adhesive layer OCA has a refractive index of 1.6. The cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm. The first central line Pcl1 of an orthographic projection of the respective protruding structure RPD on the projection plane PP and the second central line Pcl2 of an orthographic projection of the respective mesh line RML on the projection plane PP are spaced apart by a distance of zero. FIG. 6 illustrates a correlation between light transmittance and a refractive index of a respective protruding structure. Referring to FIG. 6, the curve A represents light transmittance of the mesh structure for light having a wavelength in a range of 0.40 un to 0.68 μm when the one or more protruding structures are absent; the curve B represents light transmittance of the mesh structure for light having a wavelength in a range of 0.40 μm to 0.68 μm when the one or more protruding structures are present and the respective protruding structure RPD has a refractive index of 1.65; the curve C represents light transmittance of the mesh structure for light having a wavelength in a range of 0.40 μm to 0.68 μm when the one or more protruding structures are present and the respective protruding structure RPD is made of silicon nitride having a refractive index of 2.0.

As shown in FIG. 6, when the refractive index of the respective protruding structure RPD is similar to the refractive index of the second insulating layer IN2 (e.g., the curve B), the light transmittance of the mesh structure can be significantly enhanced as compared to the mesh structure in which the one or more protruding structures are absent. When the difference between the refractive index of the respective protruding structure RPD and the refractive index of the refractive index of the second insulating layer IN2 exceeds a certain value (e.g., the curve C), the light transmittance of the mesh structure follows the same trend of variation across the range of wavelengths, however, with a far more intense resonance of the oscillation peak. This phenomenon is caused by a stronger Fabry-Perot cavity truncation effect due to the large difference between the refractive index of the second insulating layer IN2 and the refractive index of the refractive index of the respective protruding structure RPD.

In some embodiments, a difference between a refractive index of the second insulating layer and the refractive index of the of the one or more protruding structures is equal to or less than 0.2, e.g., less than 0.15, less than 0.10, or less than 0.05.

The present disclosure may be implemented with various appropriate shapes for the respective protruding structure RPD. Examples of appropriate shapes include a truncated ellipsoidal shape, a truncated cone shape, a truncated pyramid shape, a pyramid shape, a polygonal pyramid shape, a lens shape, a cone shape, a polygonal cone shape, a half sphere shape, and so on. Optionally, the respective protruding structure RPD has a truncated ellipsoidal shape, e.g., a half ellipsoidal shape. The cross-section of the respective protruding structure RPD along the plane ISP may have various appropriate shapes, including a truncated elliptical shape (e.g., a half elliptical shape), a trapezoidal shape, a truncated circle (e.g., a half circle).

Figure 7:
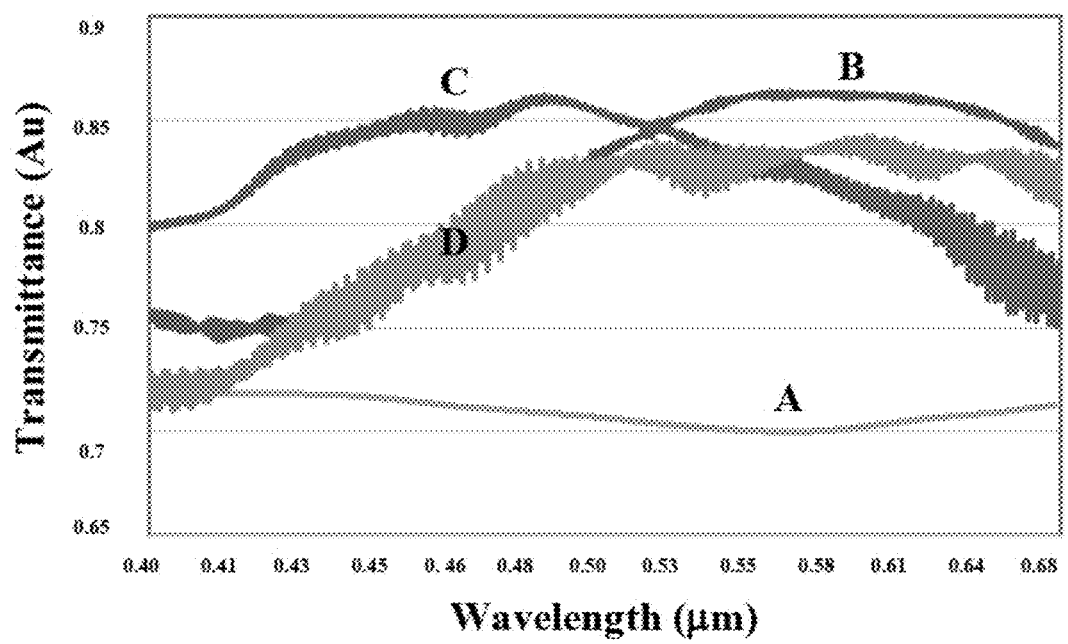
FIG. 7 illustrates a correlation between light transmittance and a shape of the respective protruding structure.

In one example, the respective mesh line RML has a line width lw of 4 μm and a thickness tml of 700 nm. The first insulating layer IN1 has a refractive index of 1.53. The optical clear adhesive layer OCA has a refractive index of 1.6. The second insulating layer IN2 has a refractive index of 1.53. The respective protruding structure RPD has a refractive index of 1.65. The first central line Pcl1 of an orthographic projection of the respective protruding structure RPD on the projection plane PP and the second central line Pcl2 of an orthographic projection of the respective mesh line RML on the projection plane PP are spaced apart by a distance of zero. FIG. 7 illustrates a correlation between light transmittance and a shape of the respective protruding structure RPD. Referring to FIG. 7, the curve A represents light transmittance of the mesh structure for light having a wavelength in a range of 0.40 μm to 0.68 μm when the one or more protruding structures are absent; the curve B represents light transmittance of the mesh structure for light having a wavelength in a range of 0.40 μm to 0.68 μm when the one or more protruding structures are present and the respective protruding structure RPD has a truncated ellipsoidal shape and the cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm; the curve C represents light transmittance of the mesh structure for light having a wavelength in a range of 0.40 μm to 0.68 μm when the one or more protruding structures are present and the respective protruding structure RPD has a truncated pyramid shape, with a maximum value of the cross-section width csw of 4 μm, a thickness tpd of the respective protruding structure RPD along the protruding direction Dpd of 1 μm, and a minimum value of the cross-section width of 1 μm; the curve D represents light transmittance of the mesh structure for light having a wavelength in a range of 0.40 μm to 0.68 μm when the one or more protruding structures are present and the respective protruding structure RPD has a pyramid shape, with a maximum value of the cross-section width csw of 4 μm, a thickness tpd of the respective protruding structure RPD along the protruding direction Dpd of 1 μm, and a minimum value of the cross-section width of 0 μm.

As shown in FIG. 7, when the respective protruding structure RPD has a truncated ellipsoidal shape, the light transmittance of the mesh structure can be significantly enhanced as compared to the mesh structure in which the one or more protruding structures are absent. When the respective protruding structure RPD has a shape other than the truncated ellipsoidal shape, the light transmittance of the mesh structure can still be enhanced, however, with a far more intense resonance of the oscillation peak. This phenomenon is caused by a stronger Fabry-Perot cavity truncation effect due to a surface that is not continuously smoothly transitioned, e.g., not continuously smoothly curved. For example, a surface of a truncated pyramid shape or a pyramid shape includes several side surfaces. Adjacent side surfaces form an edge dividing two adjacent side surfaces. Thus, in a truncated pyramid shape or a pyramid shape, a curvature of the shape undergoes an abrupt change in at least one region of the surface.

In some embodiments, the respective protruding structure RPD has a continuously curved protruding surface. Optionally, the respective protruding structure RPD has a continuously smoothly curved protruding surface, e.g., a paraboloid surface. Optionally, a curvature of the continuously smoothly curved protruding surface is either constant or only undergoes graduate changes throughout the surface.

Referring to FIG. 1E, in some embodiments, the second insulating layer IN2 is between the one or more protruding structures (e.g., including the respective protruding structure RPD) and the first insulating layer IN1.

Figure 8:
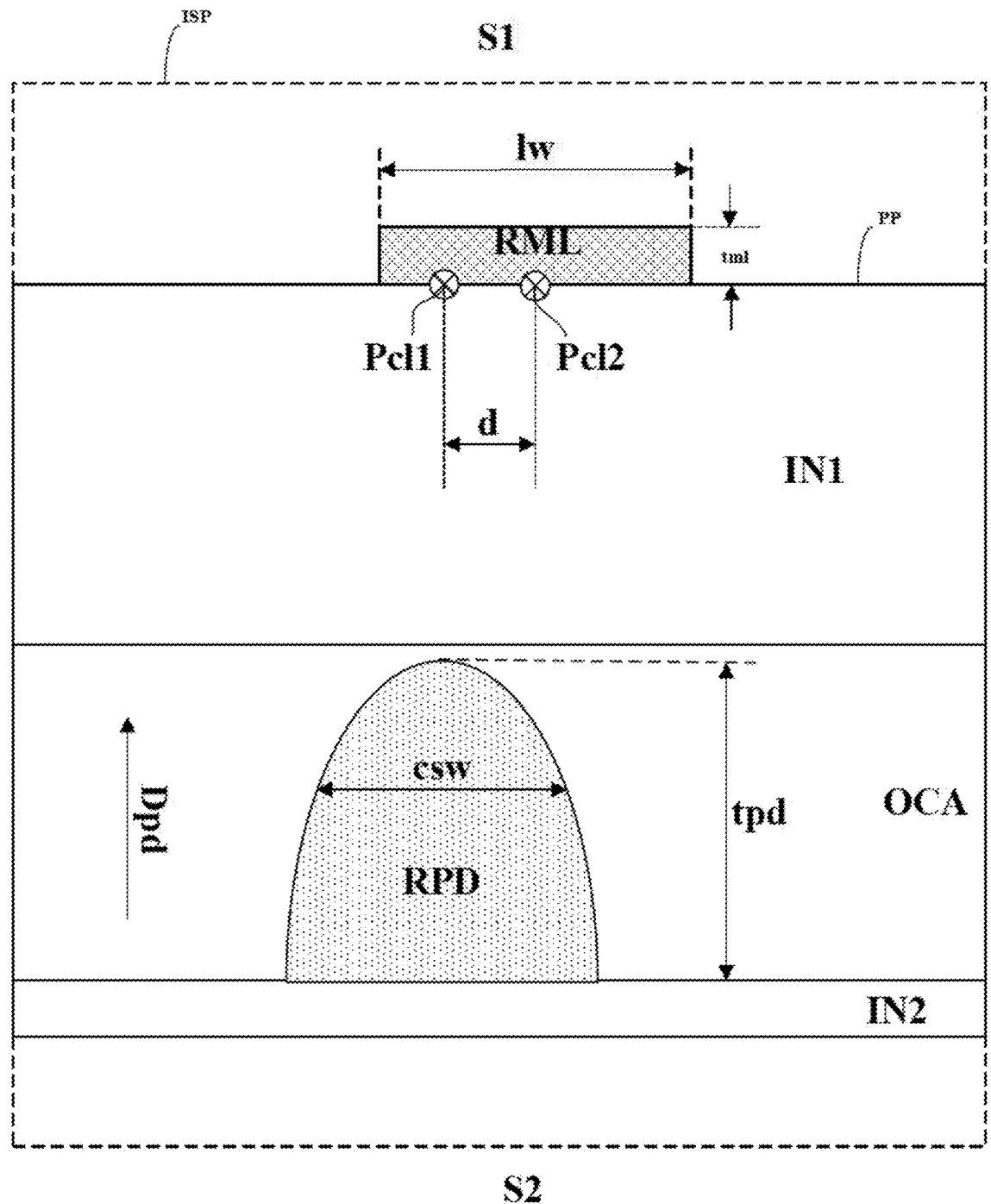
FIG. 8 is a cross-sectional view of a mesh structure in some embodiments according to the present disclosure.

FIG. 8 is a cross-sectional view of a mesh structure in some embodiments according to the present disclosure. Referring to FIG. 8, in some embodiments, the one or more protruding structures (e.g., including the respective protruding structure RPD) are between the second insulating layer IN2 and the first insulating layer IN. In some embodiments, referring to FIG. 1B and FIG. 8, a cross-section width csw of a cross-section of the respective protruding structure RPD along a plane ISP intersecting the respective protruding structure RPD and the respective mesh line RML and perpendicular to a longitudinal direction Dlg of the respective mesh line RML decreases along a protruding direction Dpd from the second side S2 to the first side S1.

Figure 9:
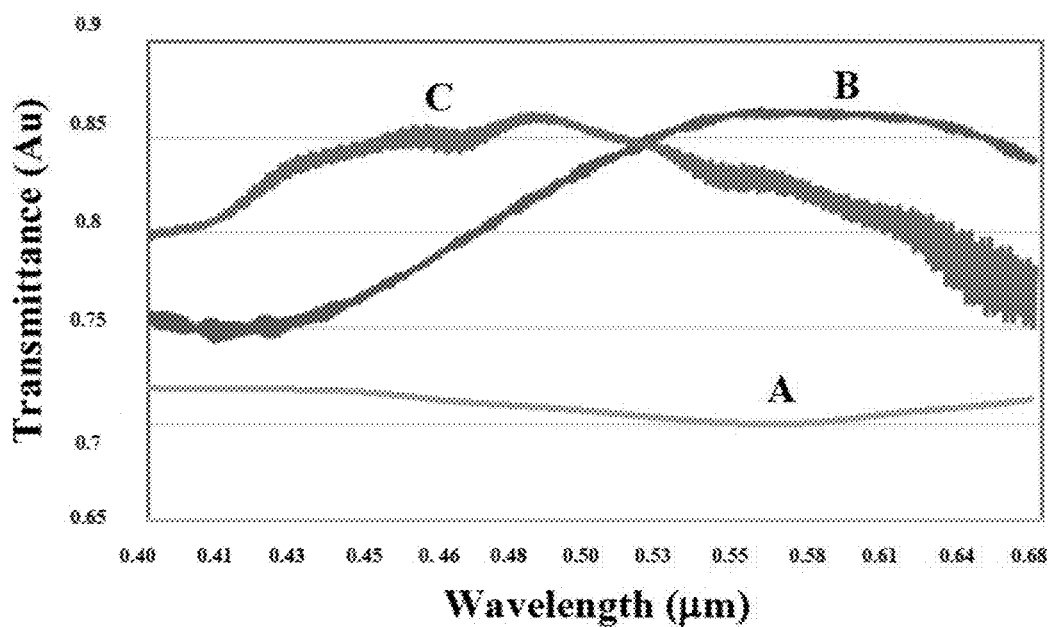
FIG. 9 illustrates a correlation between light transmittance and a position of a respective protruding structure.

In one example, the respective mesh line RML has a line width lw of 4 μm and a thickness tml of 700 nm. The first insulating layer IN1 has a refractive index of 1.53. The optical clear adhesive layer OCA has a refractive index of 1.6. The second insulating layer IN2 has a refractive index of 1.53. The cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm. The respective protruding structure RPD has a refractive index of 1.65. The first central line Pcl1 of an orthographic projection of the respective protruding structure RPD on the projection plane PP and the second central line Pcl2 of an orthographic projection of the respective mesh line RML on the projection plane PP are spaced apart by a distance of zero. FIG. 9 illustrates a correlation between light transmittance and a position of a respective protruding structure. Referring to FIG. 9, the curve A represents light transmittance of the mesh structure for light having a wavelength in a range of 0.40 μm to 0.68 μm when the one or more protruding structures are absent; the curve B represents light transmittance of the mesh structure for light having a wavelength in a range of 0.40 un to 0.68 μm when the one or more protruding structures are present and the second insulating layer IN2 is between the one or more protruding structures (e.g., including the respective protruding structure RPD) and the first insulating layer IN1; and the curve C represents light transmittance of the mesh structure for light having a wavelength in a range of 0.40 μm to 0.68 μm when the one or more protruding structures are present and the one or more protruding structures (e.g., including the respective protruding structure RPD) are between the second insulating layer IN2 and the first insulating layer IN1. Referring to FIG. 9, as compared to the mesh structure in which the one or more protruding structures are absent, the light transmittance of the mesh structure can be significantly enhanced when the one or more protruding structures are present and the second insulating layer IN2 is between the one or more protruding structures and the first insulating layer IN1, or when the one or more protruding structures are between the second insulating layer IN2 and the first insulating layer IN1.

Figure 10:
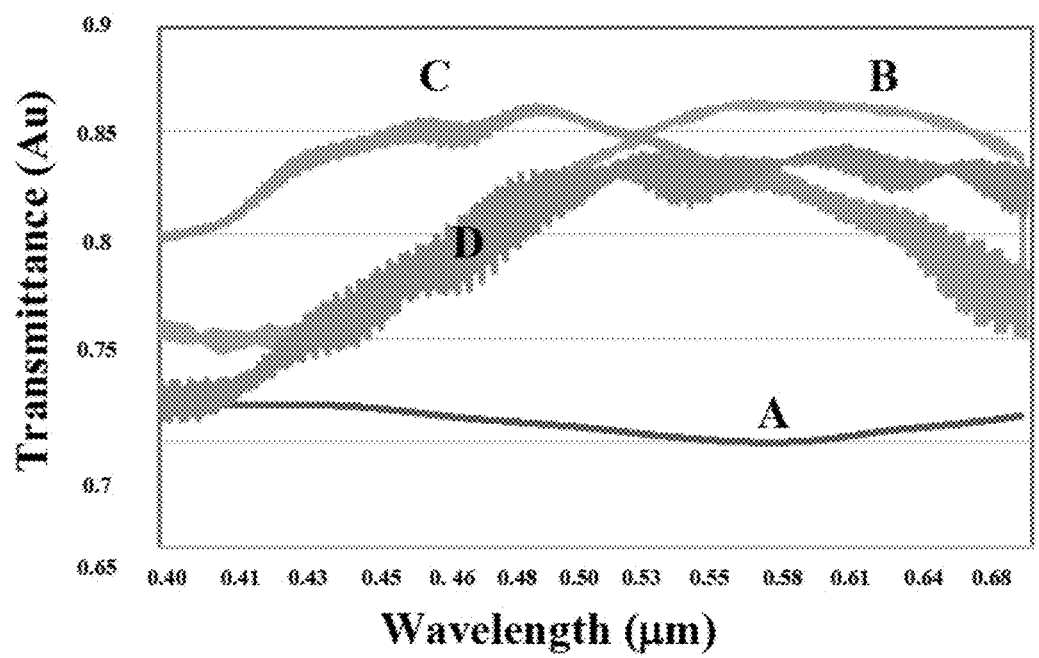
FIG. 10 illustrates a correlation between light transmittance and a shape and a position of a respective protruding structure.

In one example, the respective mesh line RML has a line width lw of 4 μm and a thickness tml of 700 nm. The first insulating layer IN1 has a refractive index of 1.53. The optical clear adhesive layer OCA has a refractive index of 1.6. The second insulating layer IN2 has a refractive index of 1.53. The respective protruding structure RPD has a refractive index of 1.65. The first central line Pcl1 of an orthographic projection of the respective protruding structure RPD on the projection plane PP and the second central line Pcl2 of an orthographic projection of the respective mesh line RML on the projection plane PP are spaced apart by a distance of zero. FIG. 10 illustrates a correlation between light transmittance and a shape and a position of a respective protruding structure. Referring to FIG. 10, the curve A represents light transmittance of the mesh structure for light having a wavelength in a range of 0.40 un to 0.68 μm when the one or more protruding structures are absent; the curve B represents light transmittance of the mesh structure for light having a wavelength in a range of 0.40 μm to 0.68 μm when the one or more protruding structures are present, the respective protruding structure RPD has a truncated ellipsoidal shape and the cross-section of the respective protruding structure RPD along the plane ISP has a half elliptical shape, with a short axis diameter (equivalent to a maximum value of the cross-section width csw) of 4 μm and a long axis radius (equivalent to a thickness tpd of the respective protruding structure RPD along the protruding direction Dpd) of 4 μm, and the second insulating layer IN2 is between the one or more protruding structures and the first insulating layer NI. The curve C represents light transmittance of the mesh structure for light having a wavelength in a range of 0.40 μm to 0.68 μm when the one or more protruding structures are present and the respective protruding structure RPD has a truncated pyramid shape, with a maximum value of the cross-section width csw of 4 μm, a thickness tpd of the respective protruding structure RPD along the protruding direction Dpd of 1 μm, and a minimum value of the cross-section width of 1 μm, and the one or more protruding structures are between the second insulating layer IN2 and the first insulating layer IN1. The curve D represents light transmittance of the mesh structure for light having a wavelength in a range of 0.40 μm to 0.68 μm when the one or more protruding structures are present and the respective protruding structure RPD has a pyramid shape, with a maximum value of the cross-section width csw of 4 μm, a thickness tpd of the respective protruding structure RPD along the protruding direction Dpd of 1 μm, and a minimum value of the cross-section width of 0 μm, and the one or more protruding structures are between the second insulating layer IN2 and the first insulating layer NI.

As shown in FIG. 10, when the respective protruding structure RPD has a truncated ellipsoidal shape, the light transmittance of the mesh structure can be significantly enhanced as compared to the mesh structure in which the one or more protruding structures are absent. When the respective protruding structure RPD has a shape other than the truncated ellipsoidal shape, the light transmittance of the mesh structure can still be enhanced, however, with a far more intense resonance of the oscillation peak. This phenomenon is caused by a stronger Fabry-Perot cavity truncation effect due to a surface that is not continuously smoothly transitioned, e.g., not continuously smoothly curved. For example, a surface of a truncated pyramid shape or a pyramid shape includes several side surfaces. Adjacent side surfaces form an edge dividing two adjacent side surfaces. Thus, in a truncated pyramid shape or a pyramid shape, a curvature of the shape undergoes an abrupt change in at least one region of the surface.

Referring to FIG. 1A and FIG. 1B, in some embodiments, the one or more protruding structures PDS includes a plurality of protrusions spaced apart from each other. An orthographic projection of a respective one of the plurality of protrusions on the projection plane PP at least partially overlaps with the orthographic projection of a portion of the one or more mesh lines ML on the projection plane PP.

Figure 11:
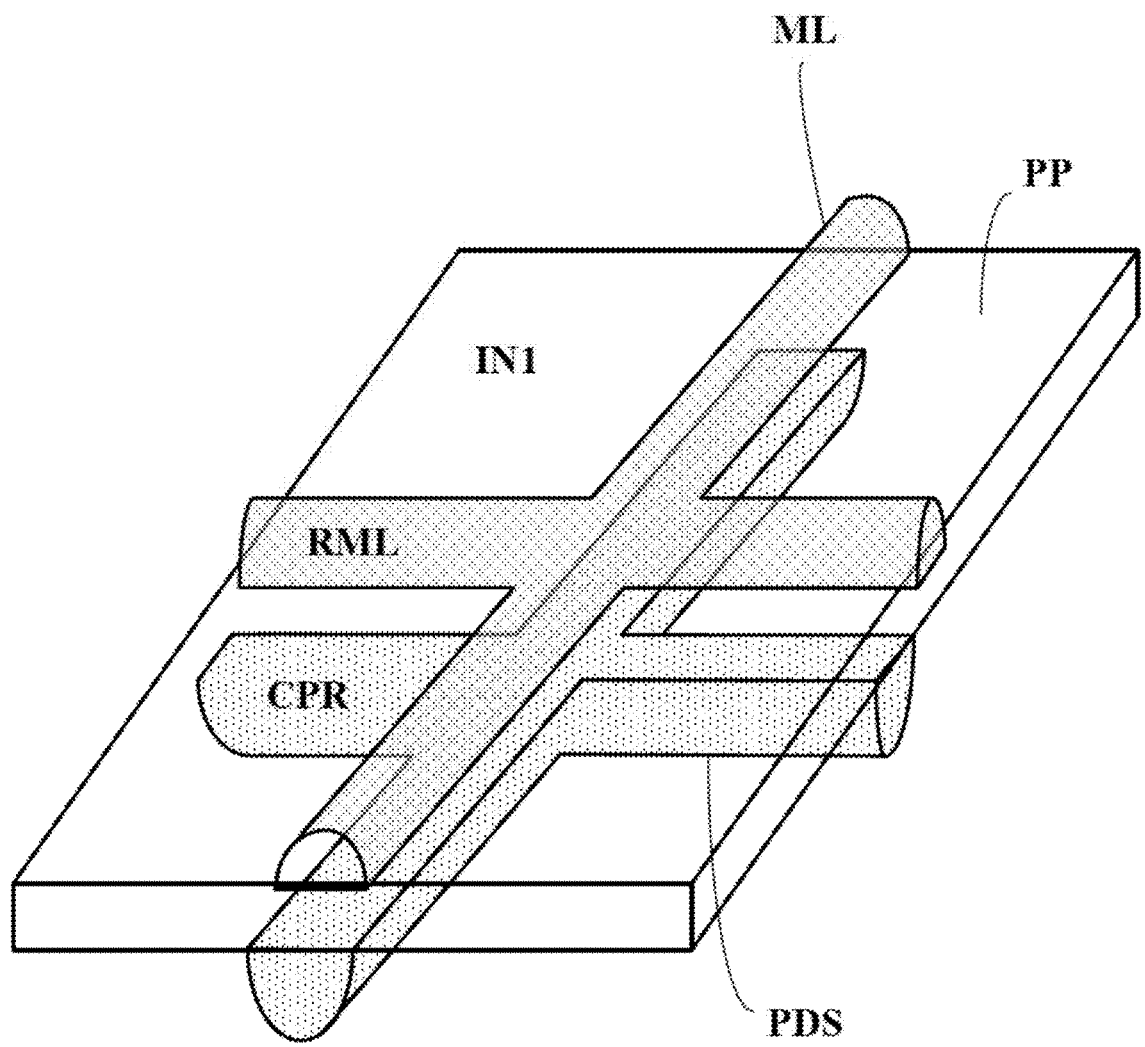
FIG. 11 is a perspective view of a portion of a mesh structure in some embodiments according to the present disclosure.

FIG. 11 is a perspective view of a portion of a mesh structure in some embodiments according to the present disclosure. Referring to FIG. 11, in some embodiments, the one or more protruding structures PDS includes a continuous protruding ridge CPR. An orthographic projection of the continuous protruding ridge CPR on the projection plane PP at least partially overlaps with the orthographic projection of the respective mesh line RML on the projection plane PP.

In another aspect, the present disclosure provides an electronic device. The electronic device includes a mesh structure described herein or fabricated by a method described herein, and a semiconductor component. Examples of appropriate electronic devices include, but are not limited to, a touch control structure, a display apparatus, a computer, a tablet, a media player, a cellular phone, a gaming device, a television, and a monitor.

In another aspect, the present disclosure provides a touch control structure. The touch control structure includes a mesh structure described herein or fabricated by a method described herein. In some embodiments, the one or more mesh lines are one or more mesh lines of touch electrodes of the touch control structure.

Figure 12A:
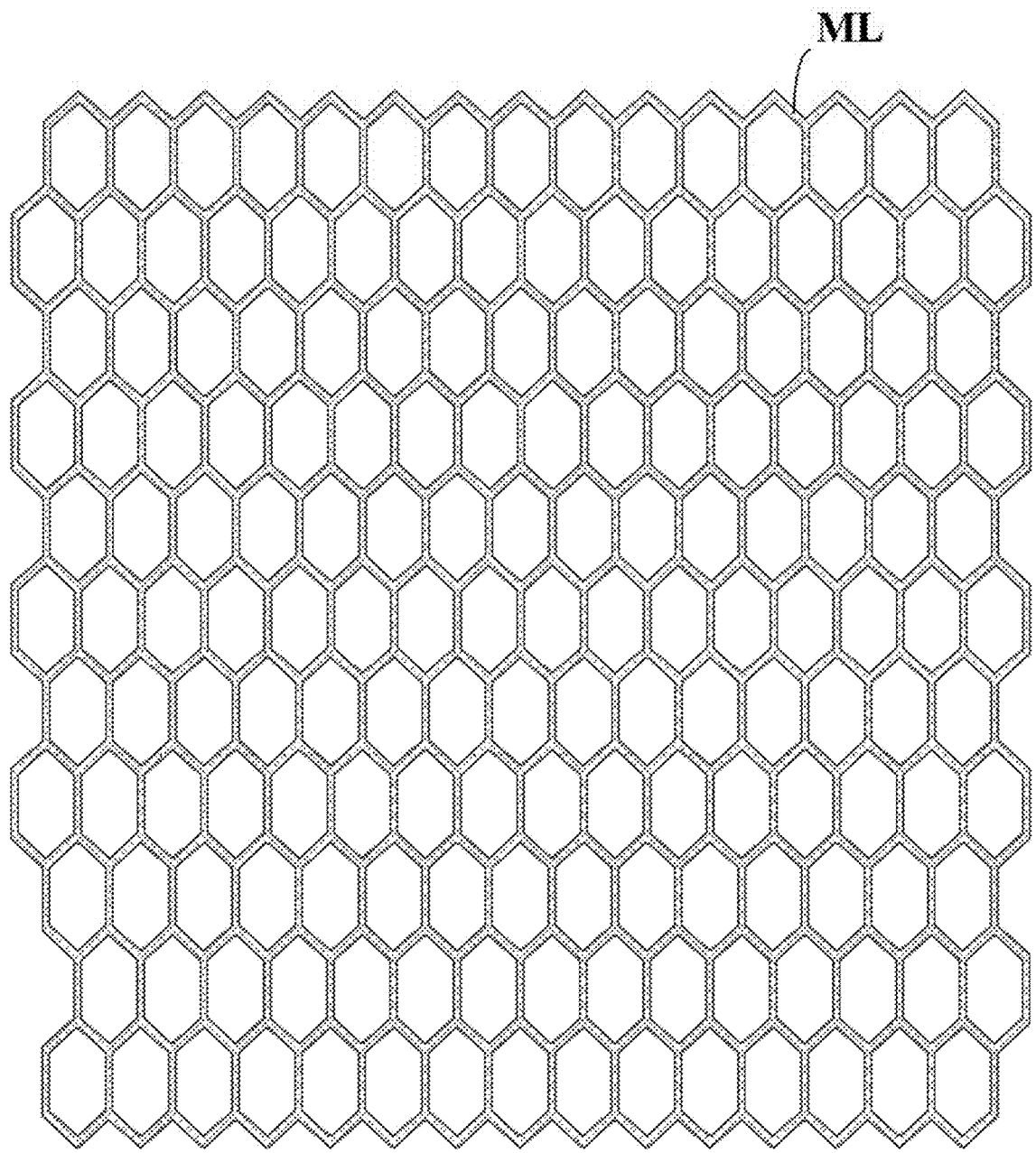
FIG. 12A is a schematic diagram illustrating one or more mesh lines in a touch control structure in some embodiments according to the present disclosure.
Figure 12B:
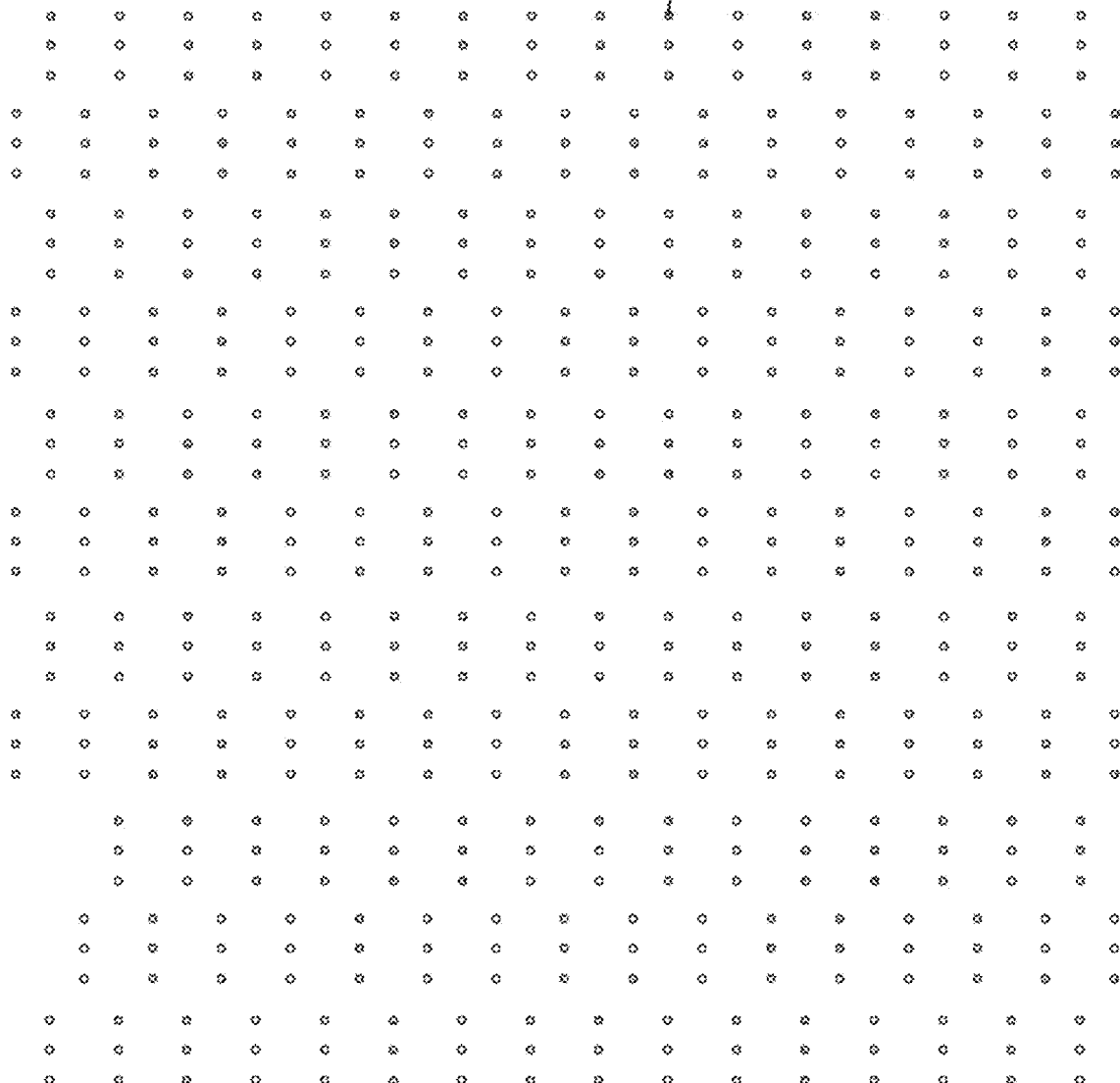
FIG. 12B is a schematic diagram illustrating one or more protruding structures in a touch control structure in some embodiments according to the present disclosure.
Figure 12C:
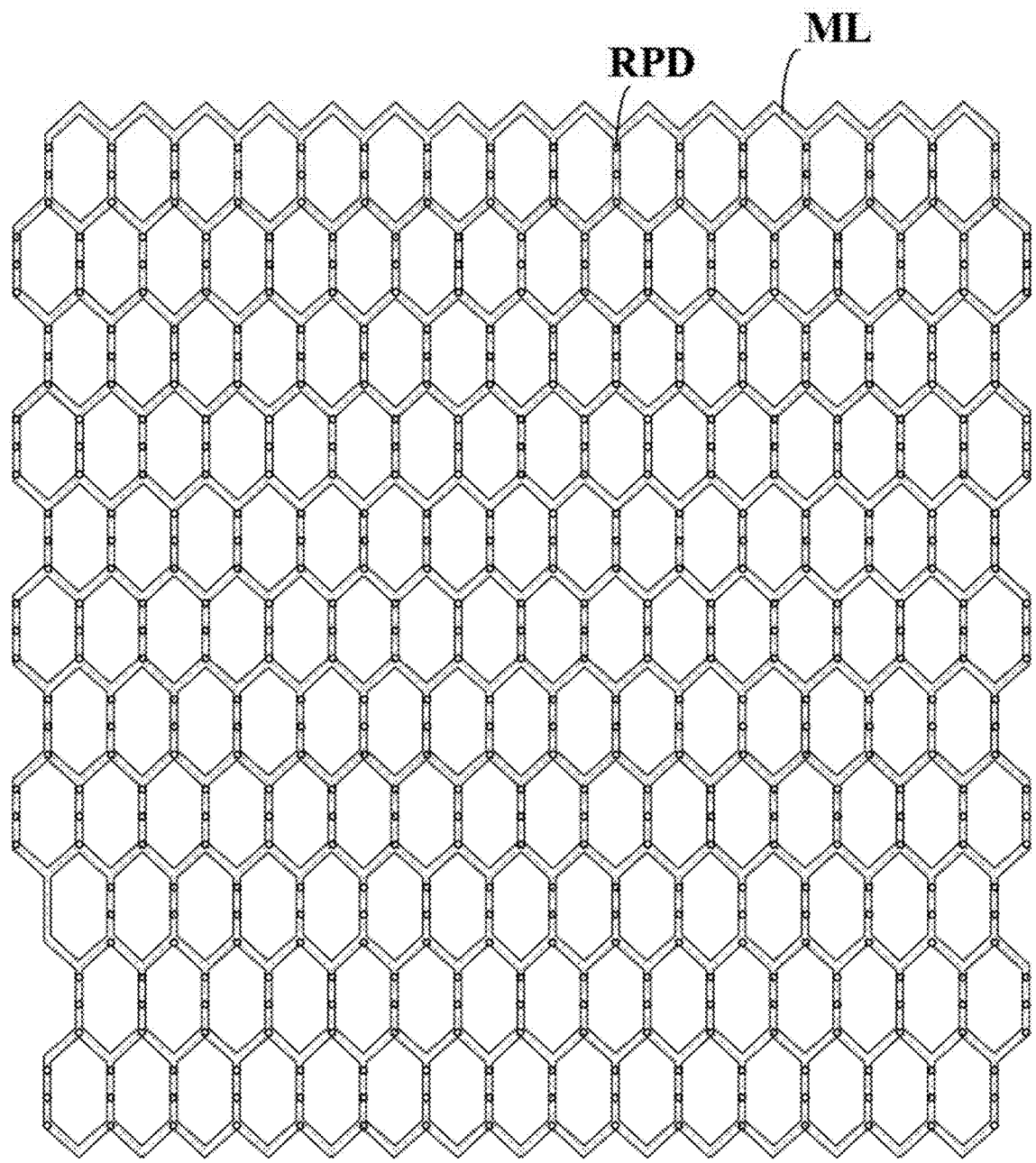
FIG. 12C is a schematic diagram illustrating one or more mesh lines and one or more protruding structures in a touch control structure in some embodiments according to the present disclosure.

FIG. 12A is a schematic diagram illustrating one or more mesh lines in a touch control structure in some embodiments according to the present disclosure. FIG. 12B is a schematic diagram illustrating one or more protruding structures in a touch control structure in some embodiments according to the present disclosure. FIG. 12C is a schematic diagram illustrating one or more mesh lines and one or more protruding structures in a touch control structure in some embodiments according to the present disclosure. Referring to FIG. 12A to FIG. 12C, in some embodiments, the one or more protruding structures PDS include a plurality of protrusions. The plurality protrusions are arranged in an array. As shown in FIG. 12C, an orthographic projection of a respective protruding structure on a base substrate at least partially overlaps with the orthographic projection of a portion of the one or more mesh lines ML on the base substrate.

Figure 12D:
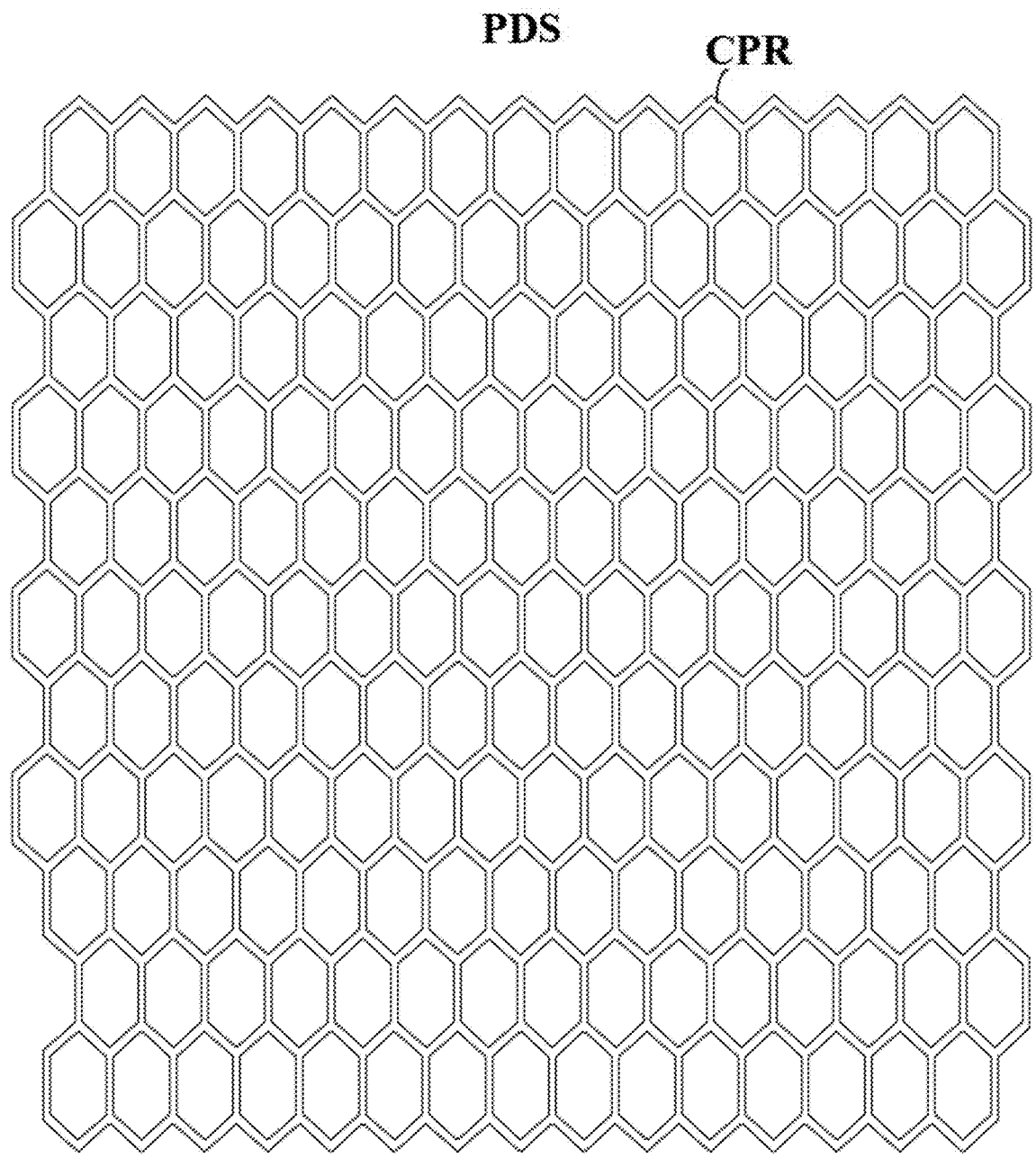
FIG. 12D is a schematic diagram illustrating a continuous protruding ridge in a touch control structure in some embodiments according to the present disclosure.
Figure 12E:
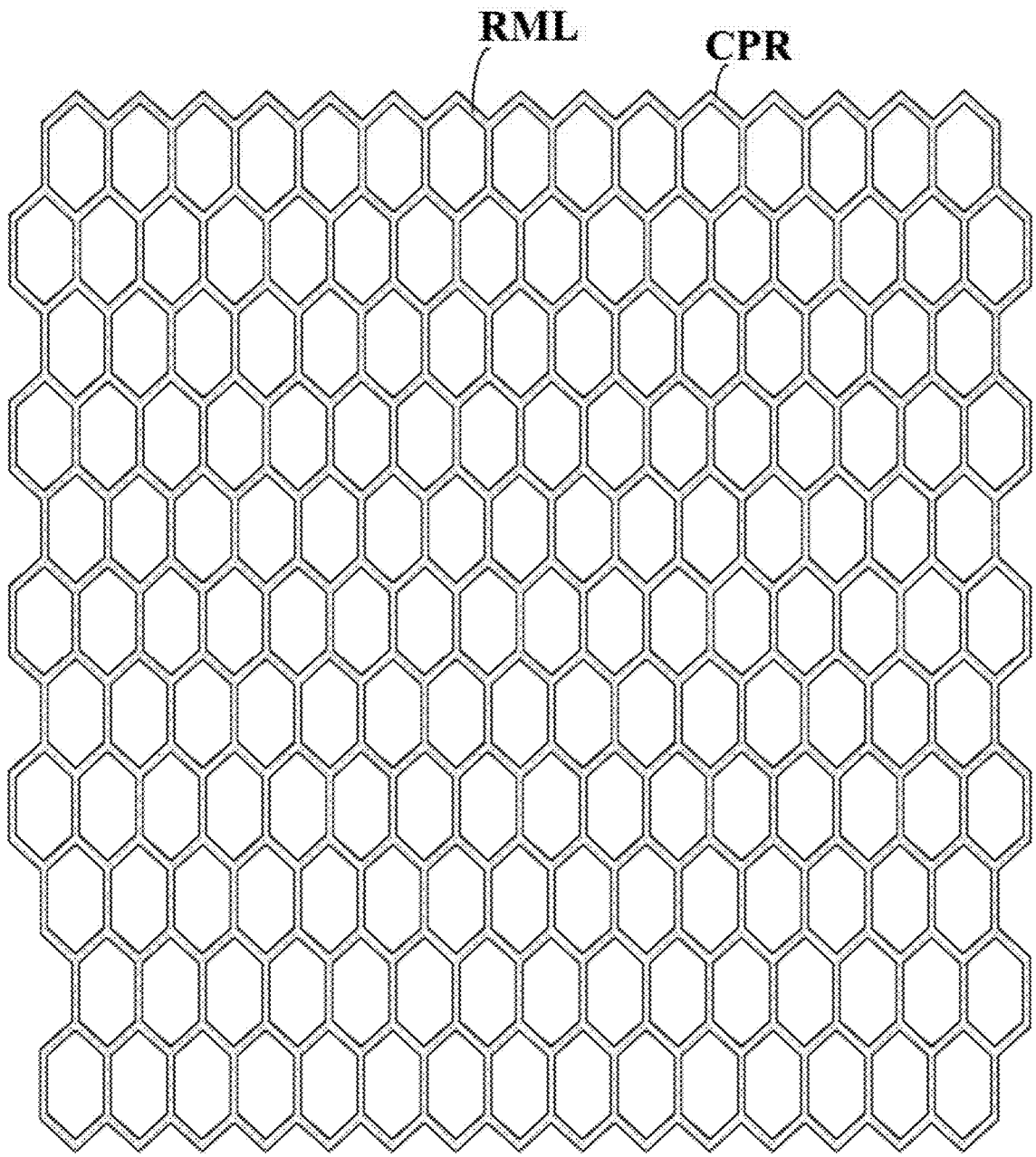
FIG. 12E is a schematic diagram illustrating one or more mesh lines and one or more protruding structures in a touch control structure in some embodiments according to the present disclosure.

FIG. 12D is a schematic diagram illustrating a continuous protruding ridge in a touch control structure in some embodiments according to the present disclosure. FIG. 12E is a schematic diagram illustrating one or more mesh lines and one or more protruding structures in a touch control structure in some embodiments according to the present disclosure. Referring to FIG. 12A, and FIG. 12D to FIG. 12E, in some embodiments, the one or more protruding structures includes a continuous providing ridge CPR. As shown in FIG. 12E, an orthographic projection of the continuous protruding ridge CPR on a base substrate at least partially overlaps with the orthographic projection of a respective mesh line RML on the base substrate.

In another aspect, the present disclosure provides a display panel. In some embodiments, the display panel includes light emitting elements; and the mesh structure described herein or fabricated by a method described herein. The one or more mesh lines are on a side of the one or more protruding structures away from the light emitting elements. The mesh structure provided by the present disclosure significantly enhances light transmittance of the display panel, as discussed above.

In another aspect, the present disclosure provides a display apparatus. In some embodiments, the display apparatus includes a display panel having the mesh structure described herein or fabricated by a method described herein; and an integrated circuit connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In another aspect, the present disclosure provides a method of enhancing light transmittance in a display panel having a mesh structure comprising one or more mesh lines. In some embodiments, the method of enhancing light transmittance includes providing the one or more mesh lines on a first side of a first insulating layer; providing one or more protruding structures on a second side of the first insulating layer, the second side being opposite to the first side; and diffracting light emitted from light emitting elements of the display panel by the one or more protruding structures to enhance light transmittance of the display panel.

Optionally, an orthographic projection of a respective protruding structure on a projection plane containing a surface of the first insulating layer at least partially overlaps with an orthographic projection of a respective mesh line on the projection plane. Optionally, a refractive index of the one or more protruding structures is greater than a refractive index of the first insulating layer. Optionally, a cross-section width of a cross-section of the respective protruding structure along a plane intersecting the respective protruding structure and the respective mesh line and perpendicular to a longitudinal direction of the respective mesh line decreases along a protruding direction from the first side to the second side.

In another aspect, the present disclosure provides a method of fabricating a mesh structure. In some embodiments, the method includes forming one or more mesh lines on a first side of a first insulating layer; and forming one or more protruding structures on a second side of the first insulating layer, the second side being opposite to the first side. Optionally, an orthographic projection of a respective protruding structure on a projection plane containing a surface of the first insulating layer at least partially overlaps with an orthographic projection of a respective mesh line on the projection plane. Optionally, a refractive index of the one or more protruding structures is greater than a refractive index of the first insulating layer. Optionally, a cross-section width of a cross-section of the respective protruding structure along a plane intersecting the respective protruding structure and the respective mesh line and perpendicular to a longitudinal direction of the respective mesh line decreases along a protruding direction from the first side to the second side.

Optionally, a first central line of an orthographic projection of the respective protruding structure on the projection plane and a second central line of an orthographic projection of the respective mesh line on the projection plane are spaced apart from each other by a distance in a range of 0 to 75% of a line width of the respective mesh line.

Optionally, a first central line of an orthographic projection of the respective protruding structure on the projection plane and a second central line of an orthographic projection of the respective mesh line on the projection plane are spaced apart from each other by a distance in a range of 0 to 75% of a maximum value of the cross-section width.

Optionally, the first central line and the second central line are substantially parallel to the longitudinal direction.

Optionally, a maximum value of the cross-section width is in a range of 12.5% to 150% of a thickness of the respective protruding structure along the protruding direction.

Optionally, the maximum value of the cross-section width is in a range of 75% to 125% of the thickness of the respective protruding structure along the protruding direction.

Optionally, a thickness of the respective protruding structure along the protruding direction is in a range of 25% to 175% of a maximum value of the cross-section width.

In some embodiments, the method further includes forming a second insulating layer. The second insulating layer is formed to be in direct contact with the one or more protruding structures. Optionally, a difference between a refractive index of the second insulating layer and the refractive index of the of the one or more protruding structures is equal to or less than 0.2.

Optionally, the respective protruding structure is formed to have a continuously curved protruding surface. Optionally, the respective protruding structure is formed to have a continuously smoothly curved protruding surface.

Optionally, the respective protruding structure has a truncated ellipsoidal shape.

Optionally, the one or more protruding structures are formed using an optically clear material.

In some embodiments, the method further includes forming a second insulating layer and forming an optical clear adhesive layer. The second insulating layer is formed to be in direct contact with the one or more protruding structures. The optical clear adhesive layer is formed to adhere the first insulating layer and the second insulating layer together.

Optionally, the second insulating layer is formed between the one or more protruding structures and the first insulating layer.

Optionally, the one or more protruding structures are formed between the second insulating layer and the first insulating layer.

In some embodiments, forming the one or more protruding structures includes forming a plurality of protrusions. Optionally, an orthographic projection of a respective one of the plurality of protrusions on the projection plane at least partially overlaps with the orthographic projection of a portion of the one or more mesh lines on the projection plane.

In some embodiments, forming the one or more protruding structures includes forming a continuous protruding ridge. Optionally, an orthographic projection of the continuous protruding ridge on the projection plane at least partially overlaps with the orthographic projection of the respective mesh line on the projection plane.

Figure 13:
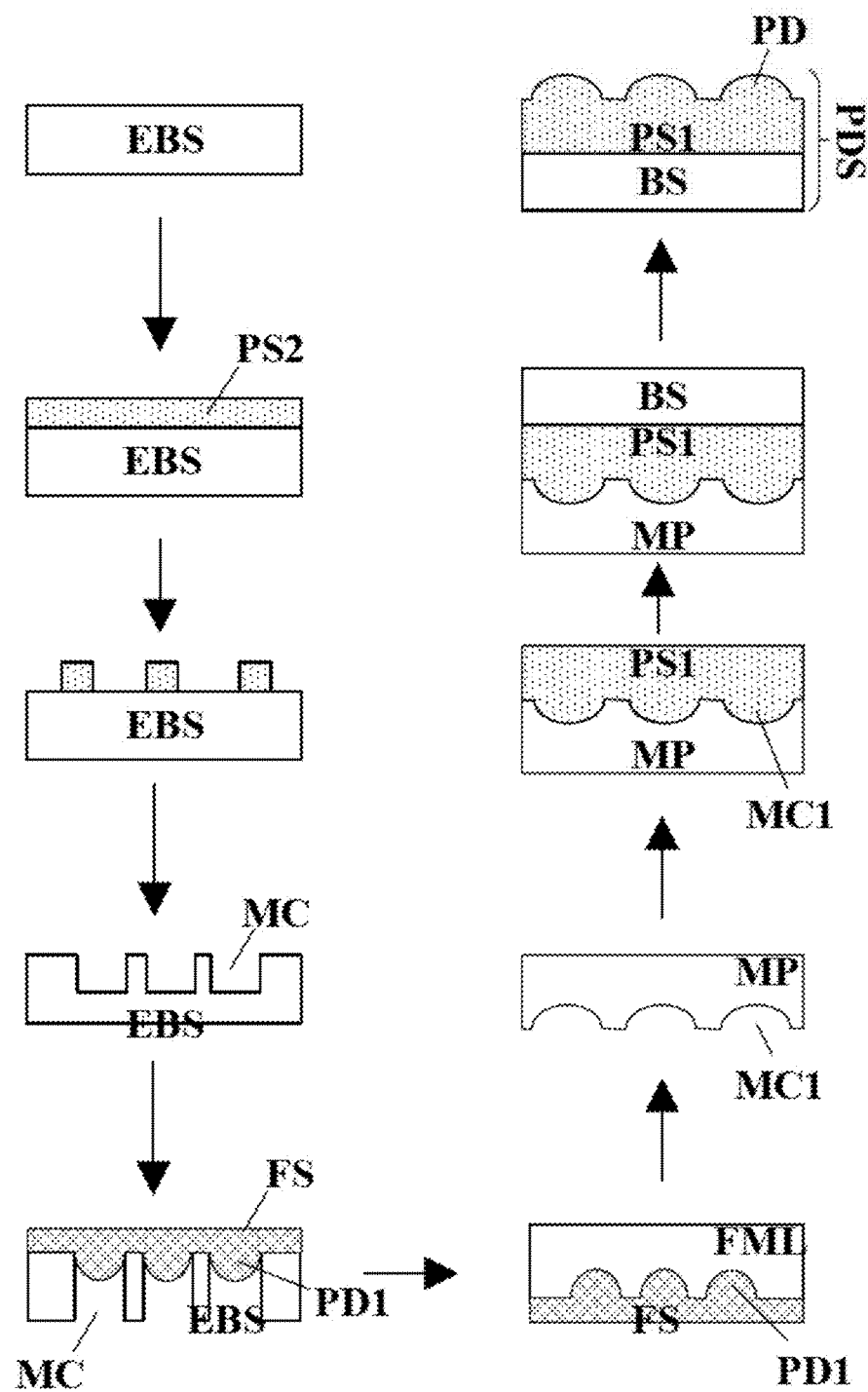
FIG. 13 illustrates a method of fabricating a mesh structure in an electronic device in some embodiments according to the present disclosure.

FIG. 13 illustrates a method of fabricating a mesh structure in an electronic device in some embodiments according to the present disclosure. Referring to FIG. 13, in some embodiments, forming the one or more protruding structures includes forming a mold plate MP having a plurality of first micro-cavities MC1, the plurality of first micro-cavities MC1 having a same pattern as a plurality of protrusions of the one or more protruding structures. In some embodiments, forming the mold plate includes forming (e.g., spin-coating) a second photoresist layer PS2 on an etchable base substrate EBS; exposing (e.g., electron beam lithography) and developing the second photoresist layer PS2 to form a pattern; etching (e.g., by deep reactive ion etching) the etchable base substrate EBS to form a plurality of micro-cavities MC in the etchable base substrate EBS, the plurality of micro-cavities MC having a same pattern as a plurality of protrusions of the one or more protruding structures; placing a fusible substrate (e.g., a glass substrate) on the etchable base substrate EBS to cover the plurality of micro-cavities MC; forming a fused substrate FS having a plurality of first protrusions PD1 by thermally fusing (optionally with a heat reflow process) the fusible substrate to render a fusible material of the fusible substrate protruding into to the plurality of micro-cavities MC; separating the fused substrate FS from the etchable base substrate EBS; forming a flexible polymer material layer FML on the fused substrate FS and in direct contact with the plurality of first protrusions PD1; and separating the flexible polymer material layer FML from the fused substrate FS thereby forming the mold plate MP having the plurality of first micro-cavities MC1. The method further includes forming a first photoresist layer PS1 on the mold plate MP, a photoresist material of the first photoresist layer PS1 filling the plurality of first micro-cavities MC1; bonding a base substrate BS to the first photoresist layer PS1 on a side of the first photoresist layer PS1 away from the mold plate MP; and separating the mold plate MP from the first photoresist layer PS1, thereby forming the one or more protruding structures PDS comprising the plurality of protrusions PD.

The example illustrated in FIG. 13 is particularly suitable for forming the one or more protruding structures on a base substrate that is not highly heat-resistant, for example, a base substrate made of an organic material such as a polymer material.

Figure 14:
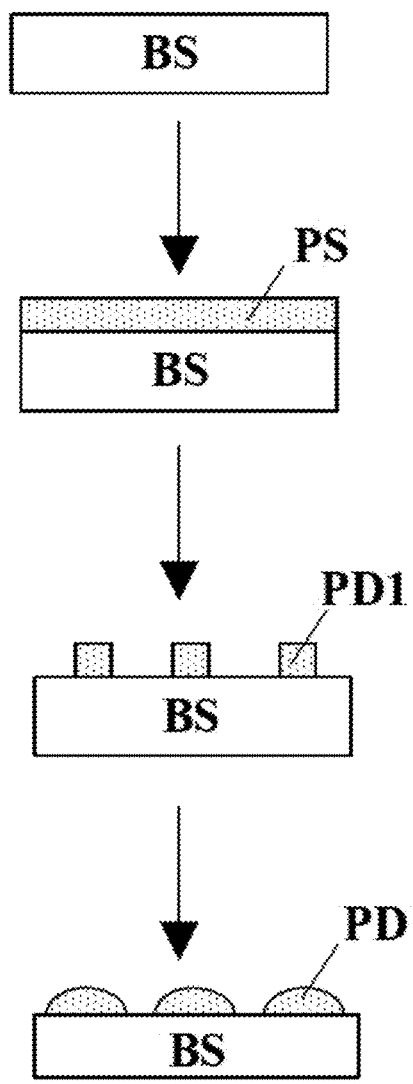
FIG. 14 illustrates a method of fabricating a mesh structure in an electronic device in some embodiments according to the present disclosure.
Figure 15:
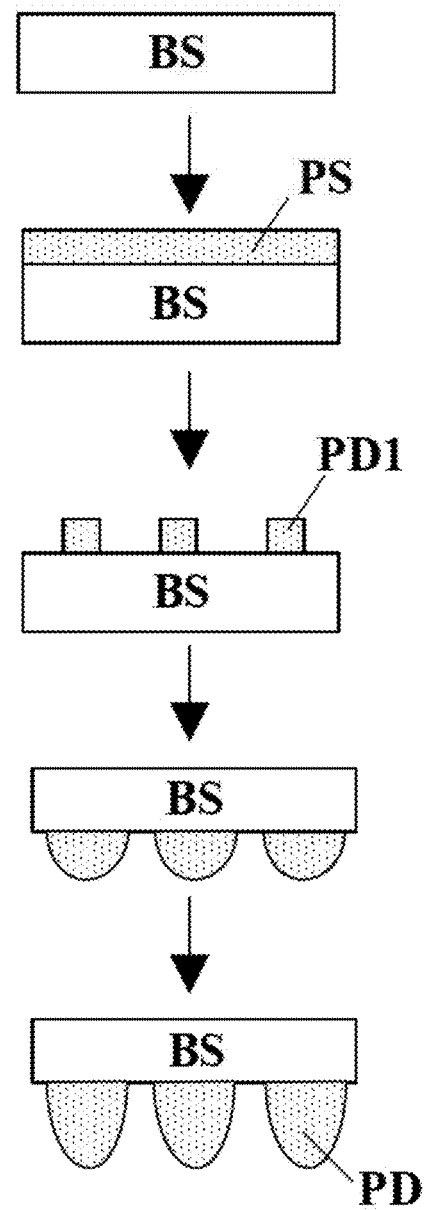
FIG. 15 illustrates a method of fabricating a mesh structure in an electronic device in some embodiments according to the present disclosure.

FIG. 14 illustrates a method of fabricating a mesh structure in an electronic device in some embodiments according to the present disclosure. FIG. 15 illustrates a method of fabricating a mesh structure in an electronic device in some embodiments according to the present disclosure. Referring to FIG. 14 and FIG. 15, in some embodiments, forming the one or more protruding structures includes forming (e.g., spin-coating) a photoresist layer PS on a base substrate BS; exposing (e.g., electron beam lithography) and developing the photoresist layer PS to form a plurality of first protrusions PD1 comprising a photoresist material on the base substrate BS, the plurality of first protrusions PD1 having a same pattern as a plurality of protrusions of the one or more protruding structures; and heating the plurality of first protrusions PD1 following by cooling the plurality of first protrusions PD1 to modify shapes of the plurality of first protrusions PD1, thereby forming the plurality of protrusions PD of the one or more protruding structures.

In FIG. 14, during the heating and cooling processes, the plurality of first protrusions PD1 remain on top of the base substrate BS. The example illustrated in FIG. 14 is particularly suitable for forming the one or more protruding structures having a relatively small thickness. In FIG. 15, during the heating and cooling processes, the base substrate BS is flipped upside down, and the plurality of first protrusions PD1 are facing downward. By the action of gravity, the plurality of first protrusions PD1 are elongated, thereby forming the one or more protruding structures having a relatively large thickness.

The examples illustrated in FIG. 14 and FIG. 15 are particularly suitable for forming the one or more protruding structures on a base substrate that is highly heat-resistant, for example, a base substrate made of an inorganic material such as silicon oxide or a heat-resistant organic material.

Figures 16, 17:
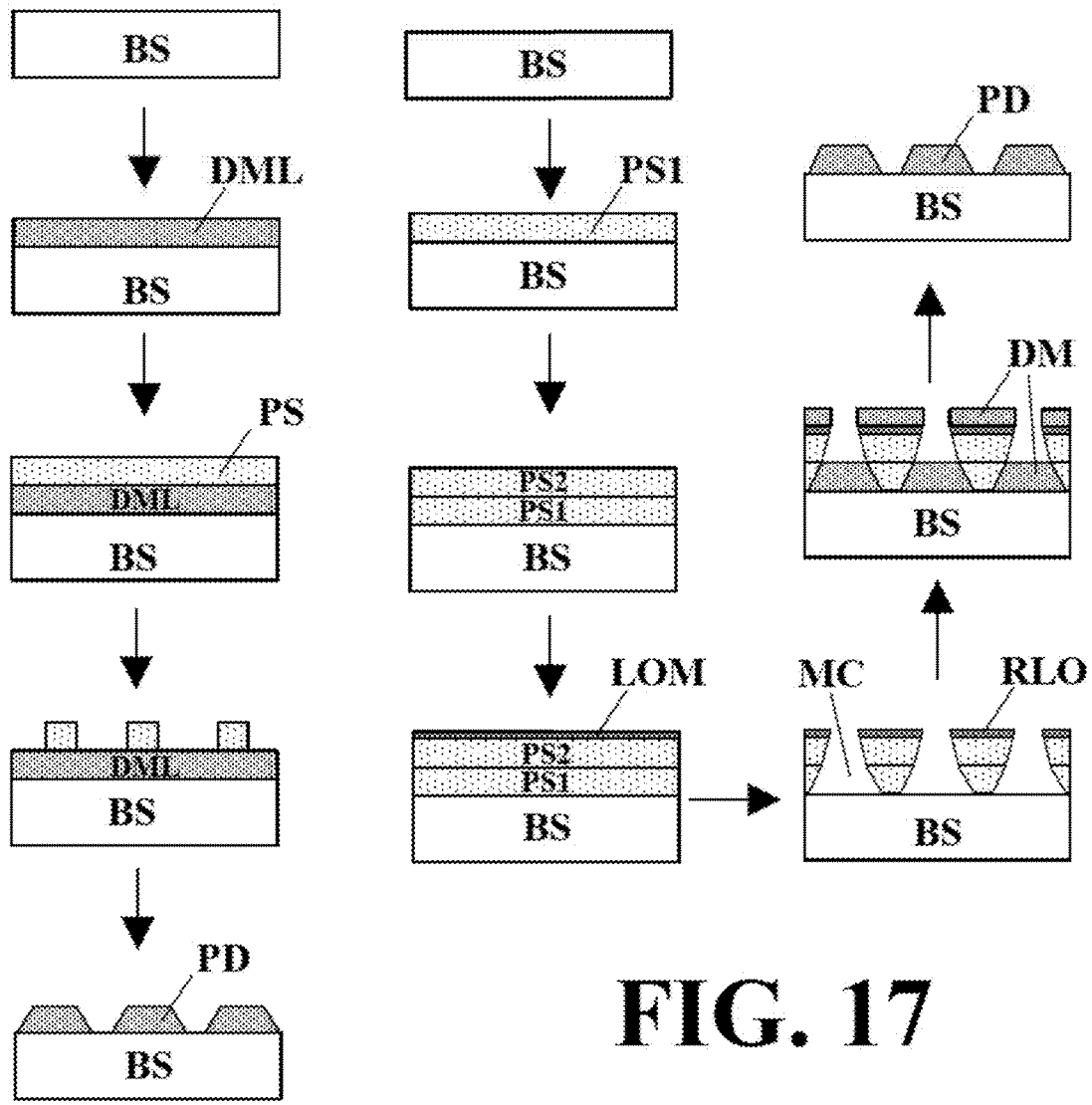
FIG. 16 illustrates a method of fabricating a mesh structure in an electronic device in some embodiments according to the present disclosure.
FIG. 17 illustrates a method of fabricating a mesh structure in an electronic device in some embodiments according to the present disclosure.

FIG. 16 illustrates a method of fabricating a mesh structure in an electronic device in some embodiments according to the present disclosure. Referring to FIG. 16, in some embodiments, forming the one or more protruding structures includes forming (e.g., by plasma-enhanced chemical vapor deposition) a dielectric material layer DML on a base substrate BS; forming (e.g., by spin-coating) a photoresist layer PS on a side of the dielectric material layer DML away from the base substrate BS; exposing (e.g., electron beam lithography) and developing the photoresist layer PS; and etching (e.g., by inductively coupled plasma etching) the dielectric material layer DML to form a plurality of protrusions PD of the one or more protruding structures.

The example illustrated in FIG. 16 is particularly suitable for forming the one or more protruding structures made of a rigid material, and is particularly suitable for forming the one or more protruding structures having a respective protruding structure having a truncated cone shape or a truncated pyramid shape.

FIG. 17 illustrates a method of fabricating a mesh structure in an electronic device in some embodiments according to the present disclosure. Referring to FIG. 17, in some embodiments, forming the one or more protruding structures includes forming (e.g., by spin-coating) a first photoresist layer PS1 on a base substrate BS; forming (e.g., by spin-coating) a second photoresist layer PS2 on a side of the first photoresist layer PS1 away from the base substrate BS; forming (e.g., by sputtering) a lift-off material layer LOM on a side of the second photoresist layer PS2 away from the first photoresist layer PS1; exposing (e.g., electron beam lithography) and developing the first photoresist layer PS1 and the second photoresist layer PS2, the first photoresist layer PS1 being exposed at a rate greater than an exposure rate of the second photoresist layer PS2, thereby forming a plurality of micro-cavities MC; depositing (e.g., by plasma-enhanced chemical vapor deposition) a dielectric material DM on the base substrate BS, a portion of the dielectric material DM being deposited on a remaining lift-off material layer RLO, a portion of the dielectric material DM being deposited in the plurality of micro-cavities MC; lifting-off a dielectric material deposited on the remaining lift-off material layer RLO; and removing remaining photoresist material, thereby forming a plurality of protrusions PD of the one or more protruding structures.

The example illustrated in FIG. 17 is particularly suitable for forming the one or more protruding structures made of a rigid material, and is particularly suitable for forming the one or more protruding structures having a respective protruding structure having a truncated cone shape or a truncated pyramid shape. In particular, the respective protruding structure can be made to have a large difference between an area of an upper surface and an area of a lower surface, according to the method illustrated in FIG. 17.

Figure 18:
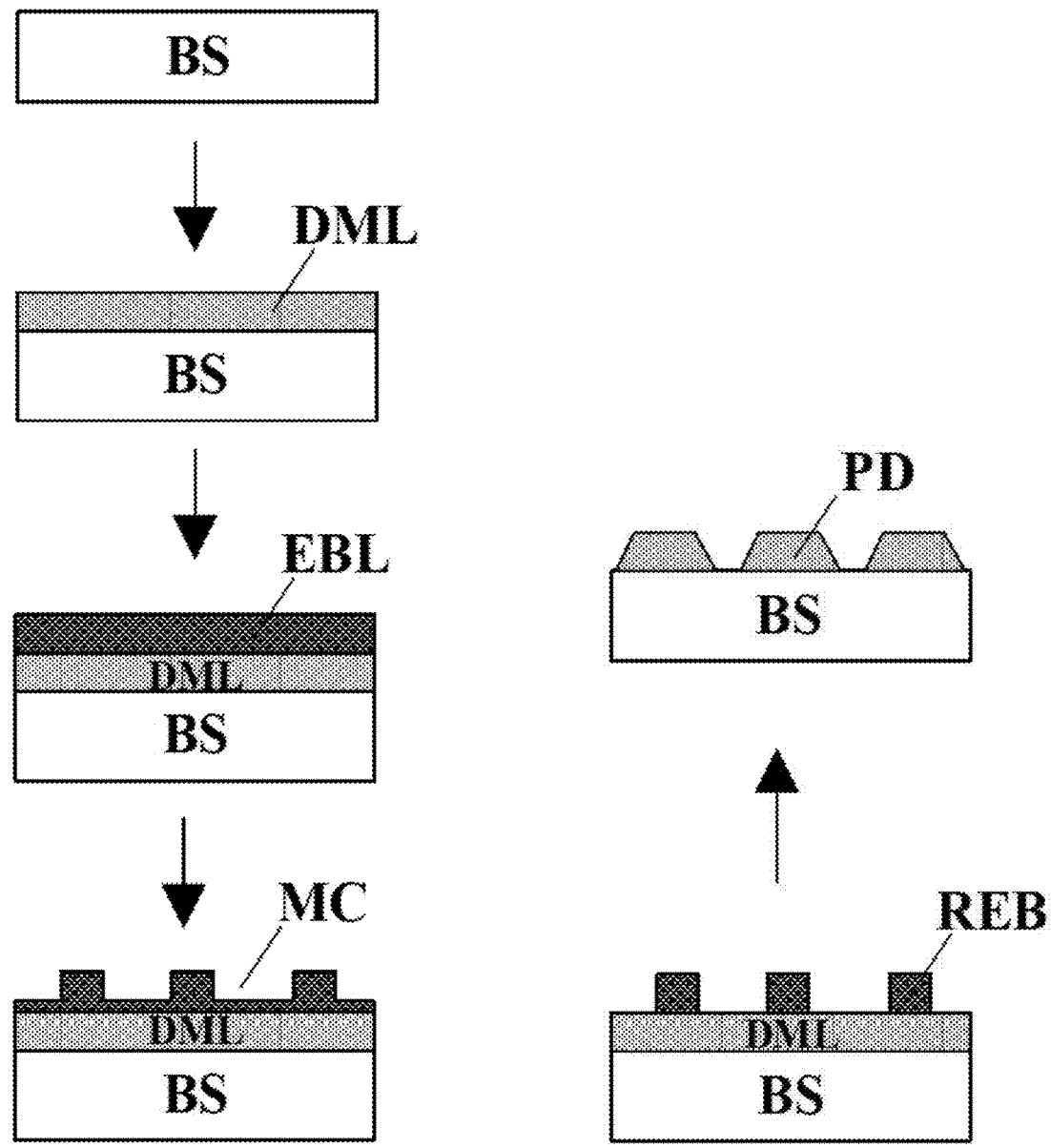
FIG. 18 illustrates a method of fabricating a mesh structure in an electronic device in some embodiments according to the present disclosure.

FIG. 18 illustrates a method of fabricating a mesh structure in an electronic device in some embodiments according to the present disclosure. Referring to FIG. 18, in some embodiments, forming the one or more protruding structures includes forming (e.g., by plasma-enhanced chemical vapor deposition) a dielectric material layer DML on a base substrate BS; forming (e.g., by spin-coating) an embossing adhesive layer EBL on a side of the dielectric material layer DML away from the base substrate BS; nano-imprinting the embossing adhesive layer to form a plurality of micro-cavities MC; removing (e.g., by inductively coupled plasma etching) an embossing adhesive material in the plurality of micro-cavities MC, thereby forming a remaining embossing adhesive material layer REB; and etching (e.g., by inductively coupled plasma etching) the dielectric material layer DML using the remaining embossing adhesive material layer REB as a mask plate, thereby forming a plurality of protrusions PD of the one or more protruding structures.

The example illustrated in FIG. 18 is particularly suitable for forming the one or more protruding structures made of a rigid material, and is particularly suitable for forming the one or more protruding structures having a respective protruding structure having a truncated cone shape or a truncated pyramid shape. The fabrication process illustrated in FIG. 18 is highly efficient, suitable for large-scale manufacturing.

Various appropriate materials and various appropriate fabricating methods may be used for making the one or more mesh lines. For example, a conductive material may be deposited on the substrate by a plasma-enhanced chemical vapor deposition (PECVD) process. Examples of appropriate metallic materials for making the one or more mesh lines include metallic materials such as aluminum, copper, silver, and gold; carbon nano-tubes, and graphene. Optionally, the mesh line has a line width in a range of 2.0 µm to 6.0 µm, e.g., 2.0 µm to 3.0 µm, 3.0 µm to 4.0 µm, 4.0 µm to 5.0 µm, or 5.0 µm to 6.0 µm. Optionally, the mesh line has a line width of 4.0 µm.

Various appropriate materials may be used for making the first insulating layer. Examples of appropriate metallic materials for making the first insulating layer include silicon oxide, silicon nitride, cyclic olefin copolymer, polyimide, and polyethylene terephthalate.

Various appropriate materials may be used for making the second insulating layer. Examples of appropriate metallic materials for making the first insulating layer include silicon oxide, silicon nitride, cyclic olefin copolymer, polyimide, and polyethylene terephthalate.

Various appropriate materials may be used for making the second insulating layer. Examples of appropriate metallic materials for making the second insulating layer include silicon oxide, silicon nitride, cyclic olefin copolymer, polyimide, and polyethylene terephthalate.

Various appropriate materials may be used for making the one or more protruding structures. Examples of appropriate metallic materials for making the one or more protruding structures include silicon oxide, silicon nitride, polydimethylsiloxane, polystyrene, and photoresist materials (e.g., SU-8 photoresist). Optionally, the one or more protruding structures are formed using an optically clear insulating material.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A mesh structure, comprising:
   a first insulating layer;
   one or more mesh lines on a first side of the first insulating layer; and
   one or more protruding structures on a second side of the first insulating layer, the second side being opposite to the first side;
   wherein an orthographic projection of one or more mesh lines on a projection plane containing a surface of the first insulating layer completely covers an orthographic projection of the one or more protruding structures on the projection plane; and a refractive index of the one or more protruding structures is greater than a refractive index of the first insulating layer.

2. The mesh structure of claim 1, wherein a cross-section width of a cross-section of the respective protruding structure along a plane intersecting the respective protruding structure and the respective mesh line and perpendicular to a longitudinal direction of the respective mesh line decreases along a protruding direction from the first side to the second side.

3. The mesh structure of claim 1, wherein a first central line of an orthographic projection of the respective protruding structure on the projection plane and a second central line of an orthographic projection of the respective mesh line on the projection plane are spaced apart from each other by a distance in a range of 0 to 75% of a line width of the respective mesh line.

4. The mesh structure of claim 1, wherein a first central line of an orthographic projection of the respective protruding structure on the projection plane and a second central line of an orthographic projection of the respective mesh line on the projection plane are spaced apart from each other by a distance in a range of 0 to 75% of a maximum value of the cross-section width.

5. The mesh structure of claim 3, wherein the first central line and the second central line are substantially parallel to the longitudinal direction.

6. The mesh structure of claim 2, wherein a maximum value of the cross-section width is in a range of 12.5% to 150% of a thickness of the respective protruding structure along the protruding direction.

7. The mesh structure of claim 6, wherein the maximum value of the cross-section width is in a range of 75% to 125% of the thickness of the respective protruding structure along the protruding direction.

8. The mesh structure of claim 1, wherein a thickness of the respective protruding structure along the protruding direction is in a range of 25% to 175% of a maximum value of the cross-section width.

9. The mesh structure of claim 1, further comprising a second insulating layer in direct contact with the one or more protruding structures;
wherein a difference between a refractive index of the second insulating layer and the refractive index of the of the one or more protruding structures is equal to or less than 0.2.

10. The mesh structure of claim 1, wherein the respective protruding structure has a continuously curved protruding surface.

11. The mesh structure of claim 1, wherein the respective protruding structure has a truncated ellipsoidal shape.

12. The mesh structure of claim 1, wherein the one or more protruding structures comprise an optically clear material.

13. The mesh structure of claim 1, further comprising a second insulating layer in direct contact with the one or more protruding structures; and
an optical clear adhesive layer adhering the first insulating layer and the second insulating layer together.

14. The mesh structure of claim 1, further comprising a second insulating layer in direct contact with the one or more protruding structures;
wherein the second insulating layer is between the one or more protruding structures and the first insulating layer.

15. The mesh structure of claim 1, further comprising a second insulating layer in direct contact with the one or more protruding structures;
wherein the one or more protruding structures are between the second insulating layer and the first insulating layer.

16. The mesh structure of claim 15, wherein a cross-section width of a cross-section of the respective protruding structure along a plane intersecting the respective protruding structure and the respective mesh line and perpendicular to a longitudinal direction of the respective mesh line decreases along a protruding direction from the second side to the first side.

17. The mesh structure of claim 1, wherein the one or more protruding structures comprise a plurality of protrusions; and
an orthographic projection of a respective one of the plurality of protrusions on the projection plane at least partially overlaps with the orthographic projection of a portion of the one or more mesh lines on the projection plane.

18. The mesh structure of claim 1, wherein the one or more protruding structures comprise a continuous protruding ridge; and
an orthographic projection of the continuous protruding ridge on the projection plane at least partially overlaps with the orthographic projection of the respective mesh line on the projection plane.

19. An electronic device, comprising the mesh structure of claim 1 and a semiconductor component.

20. A method of fabricating a mesh structure, comprising:
forming one or more mesh lines on a first side of a first insulating layer; and
forming one or more protruding structures on a second side of the first insulating layer, the second side being opposite to the first side;
wherein an orthographic projection of one or more mesh lines on a projection plane containing a surface of the first insulating layer completely covers projection of the one or more protruding structures on the projection plan;
a refractive index of the one or more protruding structures is greater than a; refractive index of the first insulating layer; and
a cross-section width of a cross-section of the respective protruding structure along a plane intersecting the respective protruding structure and the respective mesh line and perpendicular to a longitudinal direction of the respective mesh line decreases along a protruding direction from the first side to the second side.

* * * * *